(12) United States Patent
Cui et al.

(10) Patent No.: US 11,235,477 B2
(45) Date of Patent: Feb. 1, 2022

(54) ACTUATOR, ROBOT ARM AND ROBOT

(71) Applicant: INNFOS DRIVE(BEIJING)TECHNOLOGIES CO., LTD., Beijing (CN)

(72) Inventors: Haotian Cui, Beijing (CN); Xunge Yan, Beijing (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 381 days.

(21) Appl. No.: 16/285,916

(22) Filed: Feb. 26, 2019

(65) Prior Publication Data
US 2019/0262989 A1 Aug. 29, 2019

(30) Foreign Application Priority Data

Feb. 27, 2018 (CN) .......................... 201810161540.6
Jan. 21, 2019 (CN) .......................... 201910053538.1

(51) Int. Cl.
*B25J 18/04* (2006.01)
*F16H 1/46* (2006.01)
(Continued)

(52) U.S. Cl.
CPC ............. *B25J 18/04* (2013.01); *B25J 9/0021* (2013.01); *B25J 9/126* (2013.01); *B25J 18/06* (2013.01); *F16H 1/46* (2013.01); *F16H 7/023* (2013.01); *F16H 37/02* (2013.01); *F16H 49/001* (2013.01); *F16H 57/031* (2013.01); *H02K 7/116* (2013.01);
(Continued)

(58) Field of Classification Search
None
See application file for complete search history.

(56) References Cited

U.S. PATENT DOCUMENTS 4,651,591 A * 3/1987 Wurst ................. B25J 17/0258
475/9
8,878,470 B2 11/2014 Camilleri et al.
(Continued)

FOREIGN PATENT DOCUMENTS

CN 1415508 A 5/2003
CN 201410664 U 2/2010
(Continued)

OTHER PUBLICATIONS

3rd Office Action dated Sep. 15, 2020 by the CN Office; CN 201910053538.1.
(Continued)

*Primary Examiner* — Howard J Sanders
*Assistant Examiner* — Gregory T Prather

(57) ABSTRACT

An actuator, a robot arm and a robot are disclosed. The actuator includes: a housing; a motor, including a motor stator and a motor rotor, wherein the motor stator is disposed on the housing, the motor rotor is rotatably connected to the housing, and the motor rotor covers the motor stator; a position encoder, disposed on the motor rotor; a motor driver, disposed on the housing, and electrically connected to the motor; a reducer, disposed on the housing, and parallelly disposed with the motor; and a transmission mechanism, connected to the motor rotor and the reducer respectively; wherein the reducer is configured to adjust a rotation speed output from the motor rotor.

20 Claims, 18 Drawing Sheets

(51) Int. Cl.
  *F16H 7/02* (2006.01)
  *F16H 57/031* (2012.01)
  *B25J 9/00* (2006.01)
  *B25J 18/06* (2006.01)
  *H02K 11/21* (2016.01)
  *H02K 11/33* (2016.01)
  *B25J 9/12* (2006.01)
  *F16H 37/02* (2006.01)
  *F16H 49/00* (2006.01)
  *H02K 7/116* (2006.01)
  *H02K 7/14* (2006.01)
  *F16H 57/02* (2012.01)
  *H02K 3/02* (2006.01)

(52) U.S. Cl.
  CPC ............... *H02K 7/14* (2013.01); *H02K 11/21* (2016.01); *H02K 11/33* (2016.01); *F16H 2057/02034* (2013.01); *H02K 3/02* (2013.01)

(56) References Cited

U.S. PATENT DOCUMENTS

| | | | |
|---|---|---|---|
| 8,975,793 B2 | 3/2015 | Palfenier et al. | |
| 10,889,011 B2* | 1/2021 | Cui | F16H 7/023 |
| 2003/0089576 A1 | 5/2003 | Peter | |
| 2003/0213087 A1 | 11/2003 | Moein et al. | |
| 2003/0222532 A1 | 12/2003 | Hsu | |
| 2004/0193318 A1* | 9/2004 | Ito | B25J 9/06 700/245 |
| 2008/0045374 A1* | 2/2008 | Weinberg | B25J 9/102 475/342 |
| 2009/0050420 A1 | 2/2009 | Poertzgen | |
| 2011/0140553 A1 | 6/2011 | Ou et al. | |
| 2012/0176007 A1* | 7/2012 | Takeuchi | H02K 7/116 310/68 B |
| 2013/0104682 A1 | 5/2013 | Schneider | |
| 2013/0276575 A1* | 10/2013 | Hoebel | F16H 35/00 74/640 |
| 2017/0148547 A1 | 5/2017 | Dolan et al. | |
| 2018/0169868 A1* | 6/2018 | Jackowski | B25J 9/126 |
| 2018/0172080 A1* | 6/2018 | Jackowski | B25J 9/1025 |
| 2019/0126464 A1* | 5/2019 | Krumbacher | B25J 17/0258 |

FOREIGN PATENT DOCUMENTS

| | | | |
|---|---|---|---|
| CN | 202374113 U | 8/2012 | |
| CN | 203911659 U | 10/2014 | |
| CN | 204114020 U | 1/2015 | |
| CN | 205479213 U | 8/2016 | |
| CN | 106169839 A | 11/2016 | |
| CN | 107116575 A | 9/2017 | |
| EP | 3285373 A1 | 2/2018 | |
| JP | 2001186716 A | 7/2001 | |
| JP | 2006074884 A | 3/2006 | |
| JP | 2010094014 A | 4/2010 | |
| KR | 100989555 B1 | 10/2010 | |
| KR | 1020140126561 * | 4/2013 | B25J 9/08 |
| KR | 20140126561 A | 10/2014 | |
| WO | 2016063314 A1 | 4/2016 | |

OTHER PUBLICATIONS

European search report and European search opinion dated Jul. 22, 2019; EP 19159602.2.
1st Office Action dated Jul. 16, 2019 by the CN Office; Appln. No. 201910053538.1.
European search report and European search opinion dated Jul. 22, 2019; EP 19159595.8.
1st Office Action dated Apr. 29, 2020 by the KR Office; KR 20190021780.
1st Office Action dated Apr. 29, 2020 by the KR Office; KR 20190022458.
1st Office Action dated Feb. 25, 2020 by the JP Office; JP 2019-030508.
1st Office Action dated Feb. 25, 2020 by the JP Office; JP 2019-030517.
Non-final office action of U.S. Appl. No. 16/285,785 dated Jun. 29, 2020.

* cited by examiner

ACTUATOR, ROBOT ARM AND ROBOT

CROSS-REFERENCE TO RELATED APPLICATIONS

The present disclosure claims priority to Chinese Patent Application No. 201810161540.6, filed with the Chinese Patent Office on Feb. 27, 2018, titled "INTEGRAL COLLIMATED DRIVE FORCE SENSING FLEXIBLE ROTARY DRIVE ACTUATOR", and Chinese Patent Application No. 201910053538.1, filed with the Chinese Patent Office on Jan. 21, 2019, titled "ACTUATOR, ROBOT ARM AND ROBOT", the entire contents of which are incorporated herein by reference.

TECHNICAL FIELD

The present disclosure relates to the technical field of robots, and in particular, relate to an actuator, a robot arm and a robot.

BACKGROUND

Robots are mechanical devices that carry out complicated operations such as capture, transportation and the like actions by simulating human beings, dogs and other living organisms. Since the robot may not be subject to muscle fatigues like the human beings and other living organisms, the robot may be devoted to long-term and high-strength work, and is very suitable for industrial production.

In the industrial production, the work stations generally have a very large space. Therefore, the volume of the robot is not strictly limited, and functionality of the robot is emphasized. However, in the commercial application fields, for example, restaurant services, hospital services and the like, the commercial space is very precious and limited. Large-sized robots may occupy more space. In the robot, robot arms are important parts for movement of the robot. In the robot arm, the actuator is the key part. The actuator includes a motor, a motor driver, a reducer and the like. In an actuator for use in the industrial production, the motor, the motor driver and the reducer are generally separately designed, and the motor is generally a motor with an inner motor rotor. Therefore, the actuator has a great length in an axial direction.

SUMMARY

An embodiment of the present disclosure provides an actuator. The actuator includes:
  a housing;
  a motor, including a motor stator and a motor rotor, wherein the motor stator is disposed on the housing, the motor rotor is rotatably connected to the housing, and the motor rotor covers the motor stator;
  a position encoder, disposed on the motor rotor;
  a motor driver, disposed on the housing, and electrically connected to the motor;
  a reducer, disposed on the housing, and parallelly disposed with the motor; and
  a transmission mechanism, connected to the motor rotor and the reducer respectively;
  wherein the reducer is configured to adjust a rotation speed output from the motor rotor.

Another embodiment of the present disclosure provides a robot arm. The robot arm includes an actuator, wherein the actuator includes:
  a housing;
  a motor, including a motor stator and a motor rotor, wherein the motor stator is disposed on the housing, the motor rotor is rotatably connected to the housing, and the motor rotor covers the motor stator;
  a position encoder, disposed on the motor rotor;
  a motor driver, disposed on the housing, and electrically connected to the motor;
  a reducer, disposed on the housing, and parallelly disposed with the motor; and
  a transmission mechanism, connected to the motor rotor and the reducer respectively;
  wherein the reducer is configured to adjust a rotation speed output from the motor rotor.

Still another embodiment of the present disclosure provides a robot, which includes a robot arm, wherein the robot arm includes an actuator. The actuator includes:
  a housing;
  a motor, including a motor stator and a motor rotor, wherein the motor stator is disposed on the housing, the motor rotor is rotatably connected to the housing, and the motor rotor covers the motor stator;
  a position encoder, disposed on the motor rotor;
  a motor driver, disposed on the housing, and electrically connected to the motor;
  a reducer, disposed on the housing, and parallelly disposed with the motor; and
  a transmission mechanism, connected to the motor rotor and the reducer respectively;
  wherein the reducer is configured to adjust a rotation speed output from the motor rotor.

BRIEF DESCRIPTION OF THE DRAWINGS

For a clearer description of the technical solutions according to the specific embodiments of the present disclosure or the technical solutions in the prior art, the accompanying drawings incorporated for illustrating the specific embodiments or the prior art are briefly described hereinafter. In all the accompanying drawings, similar elements or parts are generally denoted by similar reference numerals. In the accompanying drawings, various elements or parts are not necessarily drawn according to the actual scale.

DETAILED DESCRIPTION

The embodiments containing the technical solutions of the present disclosure are described in detail with reference to the accompanying drawings. The embodiments hereinafter are only used to clearly describe the technical solutions of the present disclosure. Therefore, these embodiments are only used as examples, but are not intended to limit the protection scope of the present disclosure.

It should be noted that unless otherwise specified, the technical terms and scientific terms used in the present disclosure shall express general meanings that may be understood by a person skilled in the art.

Figure 1:
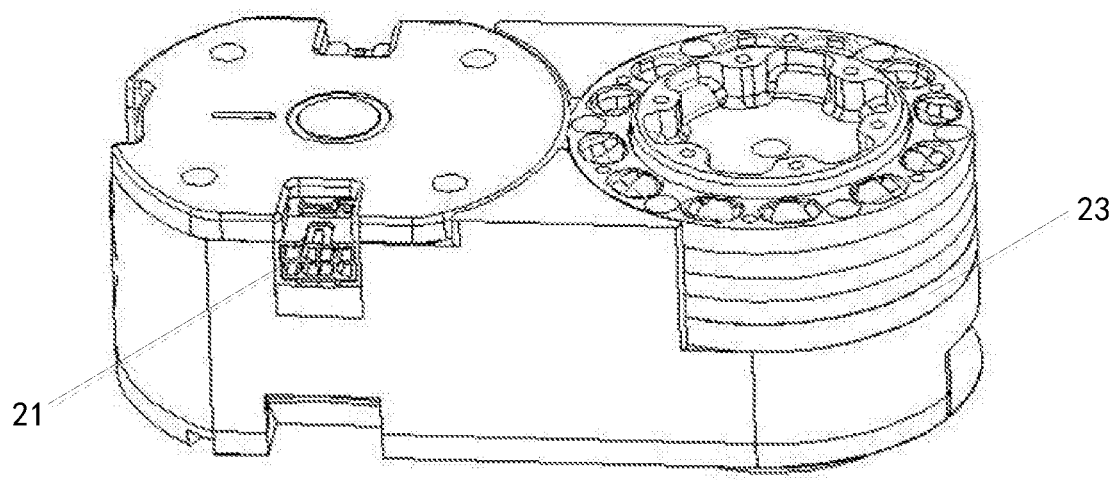
FIG. 1 is a three-dimensional diagram according to an actuator embodiment of the present disclosure.
Figure 2:
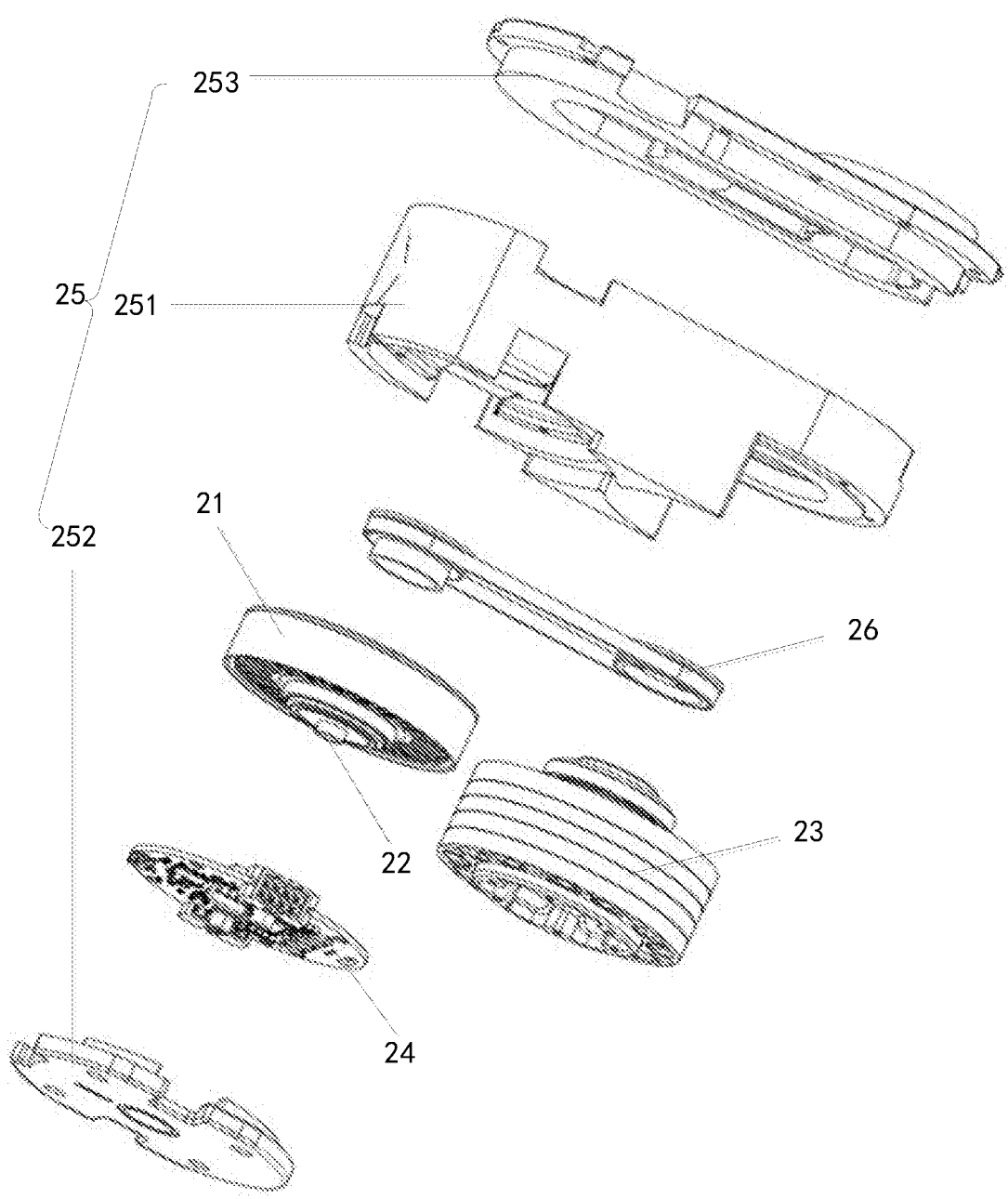
FIG. 2 is an exploded diagram according to an actuator embodiment of the present disclosure.

Referring to FIG. 1 and FIG. 2, an actuator 20 includes a motor 21, a position encoder 22, a reducer 23, a motor driver 24, a housing 25 and a transmission mechanism 26; wherein the motor driver 24 is connected to the motor 21 and is configured to drive the motor 21 to rotate, the position encoder 22 is disposed on the motor 21 and is configured to detect a position of a motor rotor 213 of the motor 21, the reducer 23 and the motor 21 are parallelly disposed on the housing 25, transmission is practiced between the reducer 23 and the motor 21 via the transmission mechanism; and the reducer 23 is configured to adjust a rotation speed output from the motor rotor 213, that is, to reduce a rotation speed of power output by the motor rotor 213 and then output the power. Since the motor 21 and the reducer 23 are parallelly disposed instead of being coaxially disposed, the height of the actuator 20 is greatly reduced, such that the actuator 20 is flatter.

Figure 3:
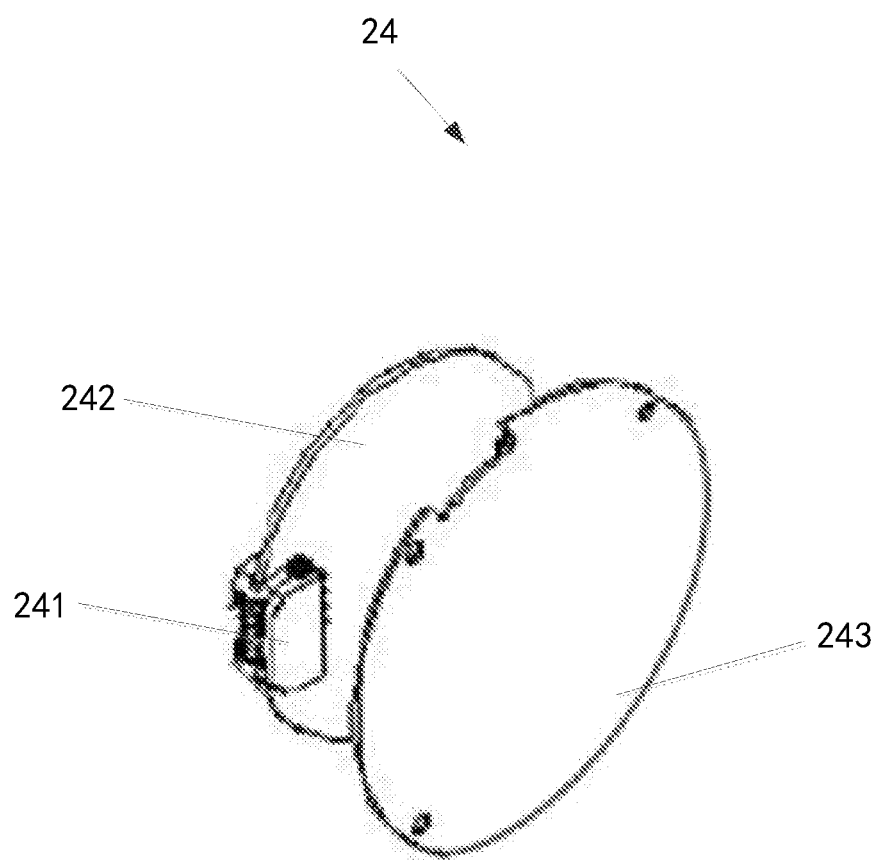
FIG. 3 is a schematic diagram of an electronic device driver according to an embodiment of the present disclosure.

With respect to the motor driver 24, as illustrated in FIG. 3, the motor driver 24 includes an external interface 241, an external interface board 242 and a drive board 243, wherein the drive board 243 overlaps the external interface board 242 and is electrically connected to the external interface 241, and the drive board 243 is connected to the motor stator and the position encoder 22. To be brief, the drive board 243 is a PCB board connected to and driving the position encoder 22 and the motor 21. The external interface 241 is configured to receive power and a control signal that are input externally, and transmit the power to the motor 21 based on the control signal to drive the motor 21 to rotate. In some embodiments, two external interfaces 241 may be provided. One external interface is configured to receive the power and the control signal, and the other external interface is configured to transmit the power and the control signal outside, such that when a plurality of actuators 20 are provided, the plurality of actuators 20 may be directly connected in series. Especially, in the arms and feet of the robot, joints of the arms and feet are constituted by actuators 20, and the joints of the same arm or foot are disposed in series. Therefore, by directly connecting the actuators 20 of the same arm or foot in series, wiring troubles caused by parallel connection of the actuators 20 may be greatly reduced. By connecting the plurality of actuators 20 in series, the plurality of actuators 20 may share one bus bar, such that energy generated by one actuator 20 may be recycled to the other actuators 20 for utilization.

It may be understood that in some other embodiments, the number of external interfaces 241 may be defined as, for example, 3, 4, 5 or the like. For connection in series of the actuators 20, the external interface board 242 supports the series connection protocols, for example, the Controller Area Network (CAN) protocol. In addition, the external interface board 242 and the drive board 243 may be integrated on one circuit board, wherein the external interface board 242 are disposed on one surface of the circuit board, and the drive board 234 are disposed on the other surface of the circuit board.

Figure 4:
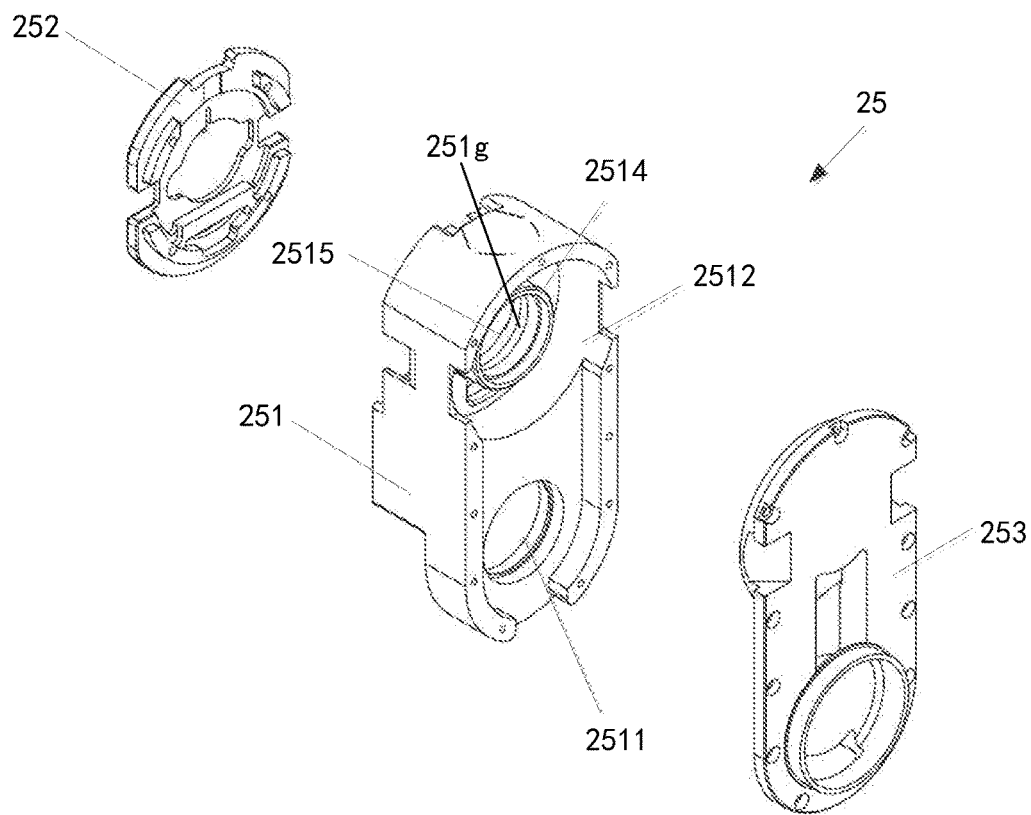
FIG. 4 is a schematic diagram taken from one view angle of a housing according to an embodiment of the present disclosure.
Figure 5:
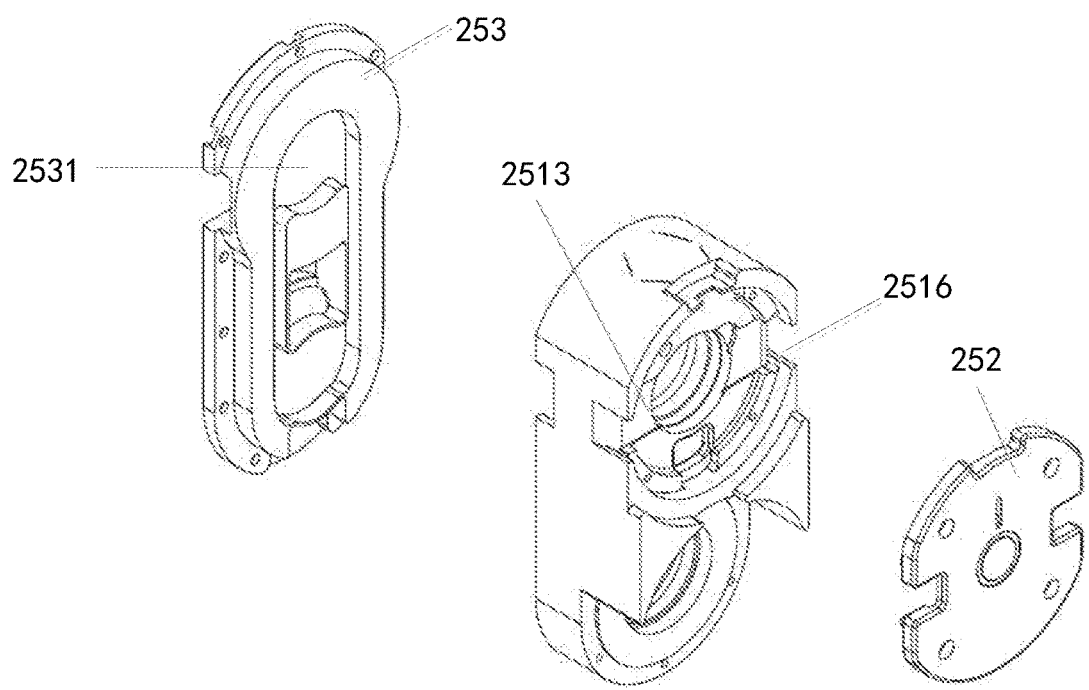
FIG. 5 is a schematic diagram taken from another view angle of a housing according to an embodiment of the present disclosure.

With respect to the housing 25, as illustrated in FIG. 4 and FIG. 5, the housing 25 includes a shell 251, a rear cover 252 and a top cover 253, wherein the shell 251 defines a motor slot 251g and an adjustment groove 2511. The motor slot 251g and the adjustment groove 2511 are parallelly defined, and the motor slot 251g and the adjustment groove 2511 both pass through the shell 251. The motor slot 251g includes a rotation groove 2512 and a drive groove 2513, a sleeve portion 2514 is extended from the bottom of the rotation groove 2512 to the interior of the rotation groove 2512 on the shell 251, and a shaft groove 2515 is defined at an end portion of the sleeve portion 2514 away from the bottom of the rotation groove 2512. In some embodiments, the rotation groove 2512 and the drive groove 2513 are respectively defined at two opposing end portions of the shell 511, and the mouths of the rotation groove 2512 and the drive groove 2513 are opposing to each other. For example, the rotation groove 2512 is defined on the front end of the shell 251, and the drive groove 2513 is defined at the rear end of the shell 251; or the rotation groove 2512 is defined at the left end of the shell 251, and the drive groove 2513 is defined at the right end of the shell 251 or the like. Nevertheless, in some other embodiments, the rotation groove 2512 and the drive groove 2513 may also be defined in any other fashion in terms of position. For example, the rotation groove 2512 is defined at the front end of the shell 251, the drive groove 2513 is defined at a side wall of the shell 251, and the mouths of the rotation groove 2512 and the drive groove 2513 are perpendicular to each other. The drive groove 2513 is configured to receive the motor driver 24; the rear cover 252 is disposed to cover the drive groove 2513, and is configured to close the drive groove 2513, such that the motor driver 24 is closed within the housing 25. Further, a drive gap 2516 may also be defined on a side wall of the drive groove 2513. When the motor driver 24 is received in the drive groove 2513, the external interface 241 is received in the drive gap 2516, such that the external interface 241 is exposed. When the rear cover 252 is disposed to cover the shell 251, the shell 251 and the rear cover 252 cooperatively hold and fix the external interface 241. The top cover 253 defines a transmission groove 2531. When the top cover 253 is disposed on the shell 25, the top cover 253 closes the mouth of the rotation groove 2512 and the port at one end of the adjustment groove 2511.

It should be understood that in some other embodiments, the external interface board 241 may also be disposed on the rear cover 252, such that the external interface board 241 is integral with the rear cover 252.

Figure 6:
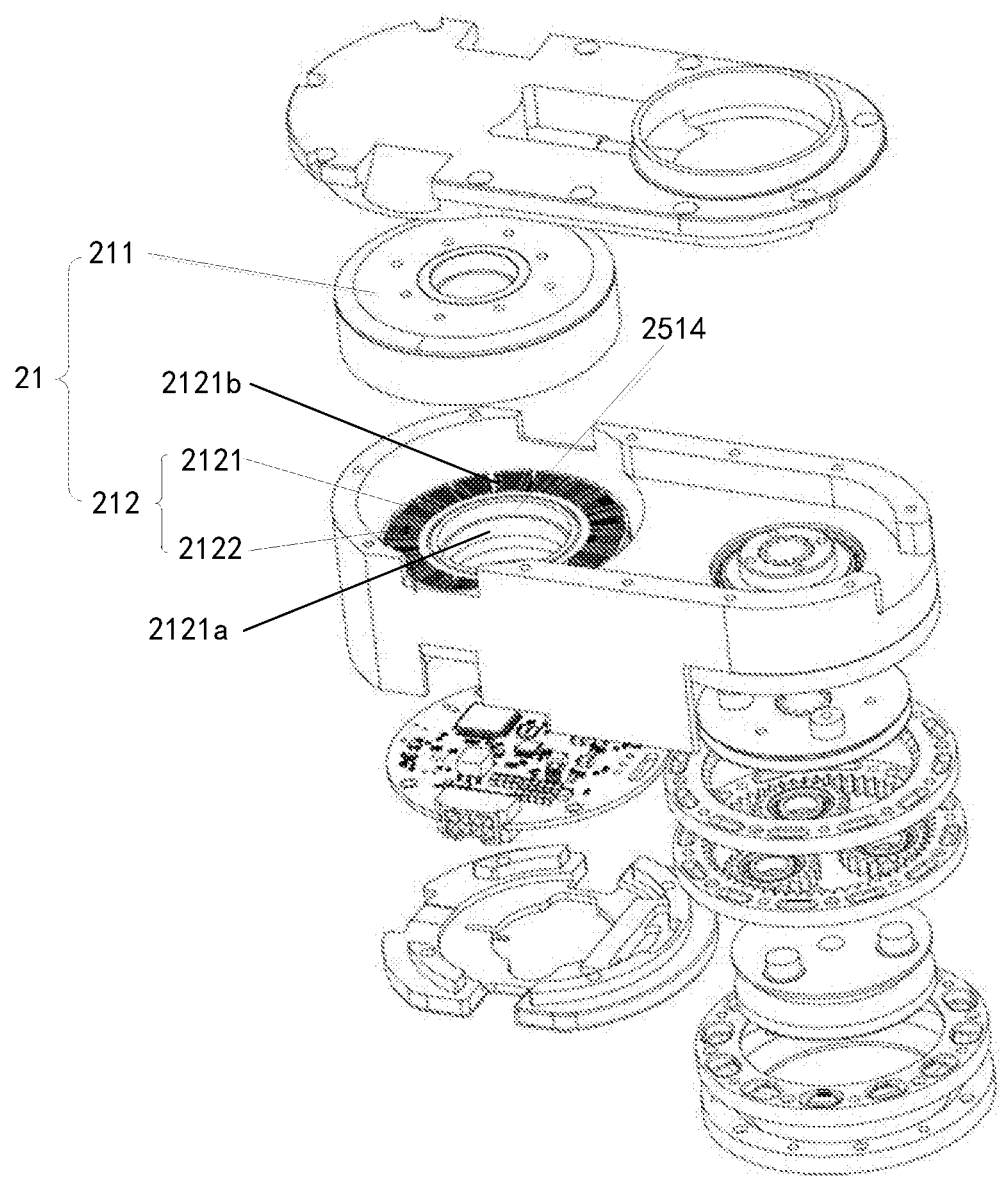
FIG. 6 is another exploded diagram of according to an actuator embodiment of the present disclosure.

With respect to the motor 21, as illustrated in FIG. 6, the motor 21 includes a motor rotor 211, a motor stator 212 and a bearing (not illustrated in the drawings).

With respect to the motor stator 212, still referring to FIG. 6, the motor stator 212 is disposed in the rotation groove 2512, and the motor stator 212 includes a skeleton 2121 and a winding 2122. The skeleton 2121 defines a pocket 2121a surrounded by a plurality of slots 2121b, wherein the winding 2122 is wound on the plurality of slots 2121b, and the skeleton 2121 is sleeved and disposed on the sleeve portion 2514 via the pocket. In some embodiments, the skeleton 2121 and the housing 25 may be both made from thermally conductive materials, such that heat generated when the winding 2122 operates is transferred to the shell 251 via the skeleton 2121, and is then transferred to the rear cover 252 and the top cover 253 via the shell 251. In this way, the heat is dissipated by the shell 251, the rear cover 252 and the top cooperatively, thereby improving the heat dissipation efficiency of the actuator 20. Optionally, the winding 2122 is a high temperature resistant coil made of enameled wire material, and the skeleton 2121 is made from silicon steel sheets.

In some embodiments, to enhance the efficiency of heat transfer between the motor stator 212 and the sleeve portion 2514, the actuator 20 may further include a thermal conducting adhesive (not illustrating in the drawings). The thermally conductive adhesive is disposed between the skeleton 2121 and the sleeve portion 2514, and heat is transferred between the skeleton 2121 and the sleeve portion 2514 via the thermally conductive adhesive. Nevertheless, via the thermally conductive adhesive, heat transfer may also be carried out at other parts of the skeleton 2121 that are in contact with the shell 251, such that the efficiency of heat transfer is improved.

With respect to the motor rotor 211, the motor rotor 211 includes a motor rotor shell (not illustrated in the drawings), a rotary shaft (not illustrated in the drawings) and a magnetic element (not illustrated in the drawings). The motor rotor shell defines an open groove (not illustrated in the drawings), the magnetic element is disposed on a side wall of the open groove, and the rotary shaft is disposed on the bottom of the open groove. Optionally, the rotary shaft is disposed on the center at the bottom of the open groove. The bearing is disposed in the shaft groove 2515, and the rotary shaft is sleeved into the bearing. In this way, the motor rotor 211 and the shell 251 are rotatably connected, and the motor 21 is received in the rotation groove 2512. When the motor rotor 211 is connected to the shell 251, the motor stator 212 is received in an open groove, and a magnetic element surrounds the motor stator 212, such that the motor stator 212 is disposed in a magnetic field of the magnetic element, and thus the motor 21 becomes a flat brushless motor with an external motor rotor. In addition, the motor 21 is designed to be flat, which greatly reduces an axial height of the motor 21. Further, the motor rotor 211 is disposed outside and a greater magnetic torque radius is achieved, and thus a high torque density is obtained. Further, flat design of the motor 21 is suitable for a hollow shaft, and for a greater outer diameter, a larger codewheel. In this way, the position encoder 22 has a higher resolution, and the motor 21 has a stronger overload capability.

With respect to the position encoder 22, the position encoder 22 may be disposed on the rotary shaft.

In some embodiments, the front shell 251, the rear cover 252 and the top cover 253 may be both made from thermally conductive metal materials, for example, copper, iron, aluminum and the like; the motor rotor shell may be made from metal materials which have an electromagnetic shielding function. In this way, when the motor driver 24, the position encoder 22, the motor stator 212 and the motor rotor 211 are all packaged in a space defined by the rear cover 252, the front shell 251 and the motor rotor shell, electromagnetic shielding may be conveniently carried out for the motor driver 24, the position encoder 22, the motor stator 212 and the motor rotor 211, such that external electromagnetic interference is not introduced and internal electromagnetic interference is not discharged. In this way, the actuator 20 has a strong anti-interference capability, and causes no interference to external electronic devices.

It should be noted that the fashion in which the motor rotor 211 and the shell 251 are rotatably connected is not limited to the above described structure. Instead, the connection may be practiced by other structures, which are not described exhaustive hereinafter any further. In addition, in the embodiment, for ease of description, the housing 25 and the motor 21 are considered as two independent parts. However, in some other embodiments, the housing 25 is described as a member or part of the motor 21.

Figure 7:
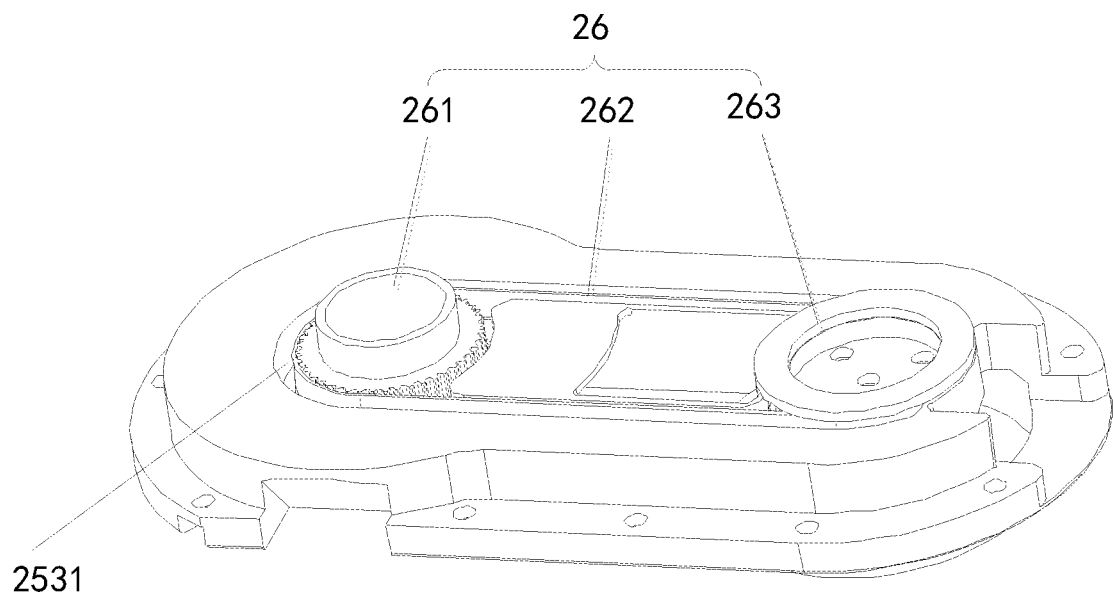
FIG. 7 is a schematic diagram of receiving a transmission mechanism in a top cover according to an actuator embodiment of the present disclosure.
Figure 8:
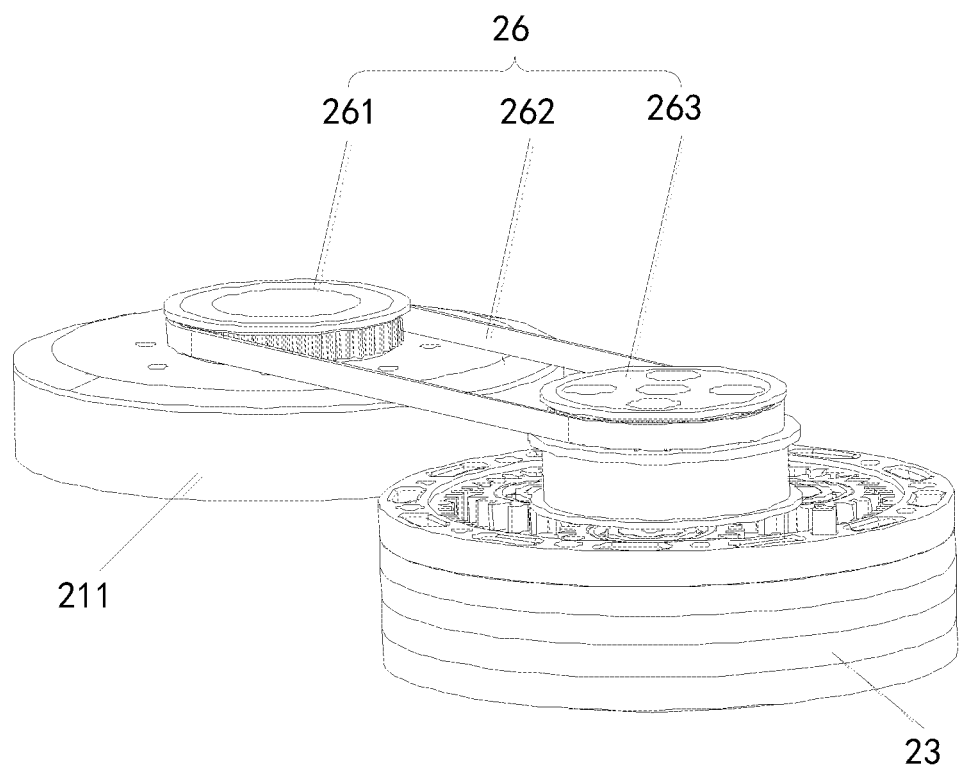
FIG. 8 is a schematic diagram of a transmission mechanism according to an embodiment of the present disclosure.

With respect to the transmission mechanism 26, as illustrated in FIG. 7 and FIG. 8, the transmission mechanism 26 is received in the transmission groove 2531 of the rear cover 252; when the top cover 253 closes the mouth of the rotation groove 2512 and the port at one end of the adjustment groove 2511, the transmission mechanism 26 is enclosed in the housing 25, such that the transmission mechanism 26 is protected, and is prevented from being directly exposed. In some embodiments, the transmission mechanism 26 includes a first synchronization wheel 261, a second synchronization wheel 262 and a synchronization belt 263. The first synchronization wheel 261 is connected to the motor rotor 211, the second synchronization wheel 263 is connected to the reducer 23, and the synchronization belt 262 is sleeved between the first synchronization wheel 261 and the second synchronization wheel 263. When the motor rotor 211 rotates, the motor rotor 211 drives the first synchronization wheel 261 to rotate, the first synchronization wheel 261 drives the synchronization belt 262 to rotate, the synchronization belt 262 drives the second synchronization wheel 263 to rotate, and the second synchronization wheel 263 input power to the reducer 23. In this way, the reducer 23 receives the power output by the motor 21 via the transmission mechanism 26.

It may be understood that the transmission mechanism 26 is not limited to the above described structure, and may also be other structures. For example, gear transmission is practiced in a fashion that a plurality of gears are in mesh with each other.

With respect to the reducer 23, the reducer 23 is received in the adjustment groove 2511, and the reducer 23 and the motor 21 are parallelly disposed.

Figure 9:
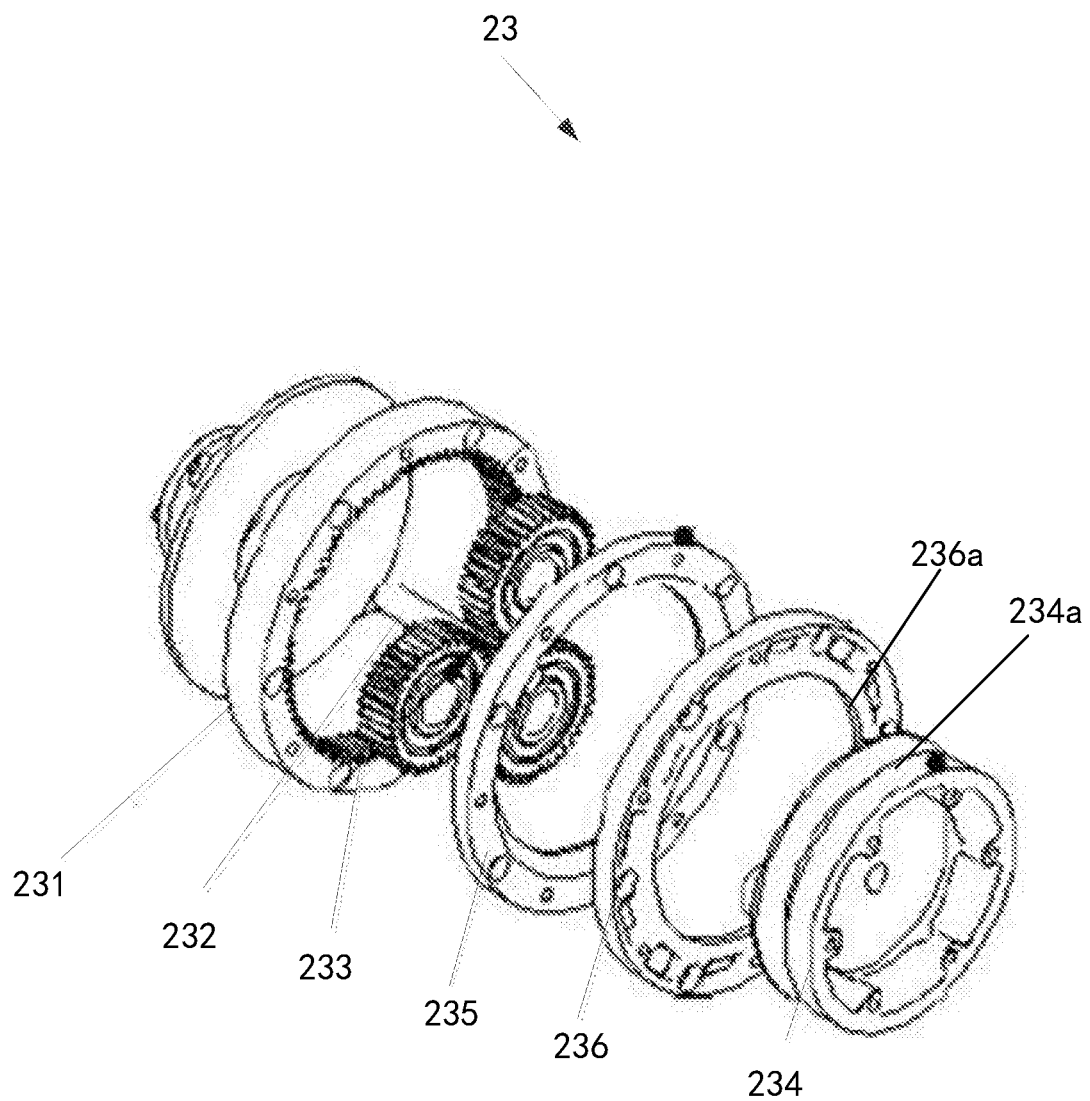
FIG. 9 is one schematic diagram of a planetary reducer according to an actuator embodiment of the present disclosure.

In some embodiments, the reducer 23 may be a planetary reducer. Specifically, as illustrated in FIG. 9, the planetary reducer includes a primary inner ring gear 231, a primary sun gear 232, a primary planetary gear 233 and a primary output rotary disc 234. A primary rotary post (not illustrated in the drawings) is disposed on a surface of the primary output rotary disc 234. The primary planetary gear 233 is sleeved to the primary rotary post via another bearing, such that the primary planetary gear 233 is disposed on a surface of the primary output rotary disc 234, and is rotatable relative to the primary output rotary disc 234. The primary inner ring gear 231 may be formed by an annular member (not illustrated in the drawings) and a ring gear (not illustrated in the drawings) disposed on an inner side wall of the annular member, the primary sun gear 232 and the primary planetary gear 233 are disposed to surround the primary inner ring gear 231, the primary planetary gear 233 is in mesh with the primary sun gear 232 and the primary inner ring gear 233 respectively, and a primary drive shaft (not illustrated in the drawings) is extended on the primary sun gear 232, wherein the primary drive shaft is connected to the transmission mechanism 26. The transmission mechanism 26 drives the primary sun gear 232 to rotate, the primary sun gear 232 drives the primary planetary gear 233 to rotate, between the primary sun gear 232 and the primary inner ring gear 231. The primary planetary gear 233 rotates around the primary sun gear 232. Such that the primary planetary gear 233 drives the primary output rotary disc 234 to rotate. The primary output rotary disc 234 is connected to a mechanical member desiring power, and outputs power to the mechanical member. For example, the primary output rotary disc acts as a joint of a robot arm to enable the robot arm to rotate. Optionally, three primary planetary gears 233 may be provided, and the three primary planetary gears 233 are uniformly spaced apart and are respectively in mesh with the primary sun gear 232 and the primary inner ring gear 231. Nevertheless, in other embodiments, the number of primary planetary gears 233 may be defined as, for example, four, five, six or the like.

It should be noted that the primary output rotary disc 234 may also be provided with a flange structure. When the primary output rotary disc 234 is provided with a flange structure, the primary output rotary disc 234 may be referred to as a planetary reducer flange. In addition, the actuator 20 integrates together the motor 21, the motor driver 24 and the reducer 23. The actuator 20 is equivalent to an integral collimated drive force sensing flexible rotary drive actuator 20 formed by a full direct drive flexible rotator plus a low reduction ratio reducer. In practical use, in the integral collimated drive force sensing flexible rotary drive actuator 20 formed by a full direct drive flexible rotator plus a low reduction ratio reducer according to the present disclosure, the low reduction ratio reducer has three primary planetary gears 233 which rotate around one primary sun gear 232. Low cost flexible control refers to improving "transparency" between the terminals of the actuator 20 and the actuator 20 by reducing dynamic impacts caused by mass and friction. The transparency allows a force applied by the motor 21 to match a force at the terminal of the actuator 20, such that a non-collocated sensor is not needed. The actuator 20 may determine an output force of a limb based on an applied torque and a joint spatial displacement measured by a motor encoder, to replace a force sensor at the terminal of the limb. This method greatly relieves instabilities caused by unmodeled mode between an actuator and an unmated sensor.

Since the primary output rotary disc 234 protrudes from the primary inner ring gear 231, to improve beauty of the actuator 20 and protect the primary output rotary disc 234, the reducer 23 may further include a first hollow annular member 235 and a second hollow annular member 236. The first hollow annular member 235 is disposed on the primary inner ring gear 231, the second hollow annular member 236 is disposed on the first hollow annular member 235, and the first hollow annular member 235 and the second hollow annular member 236 both surround the primary output rotary disc 234. In some embodiments, a surface of the second hollow annular member 236 that is distal from the first hollow annular member 235 is flush with a surface of the primary output rotary disc 234. Nevertheless, a gap is defined both between the first hollow annular member 235 and the primary output rotary disc 234 and between the second hollow annular member 236 and the primary output rotary disc 234, such that rotation of the primary output rotary disc 234 is not affected.

Figure 10:
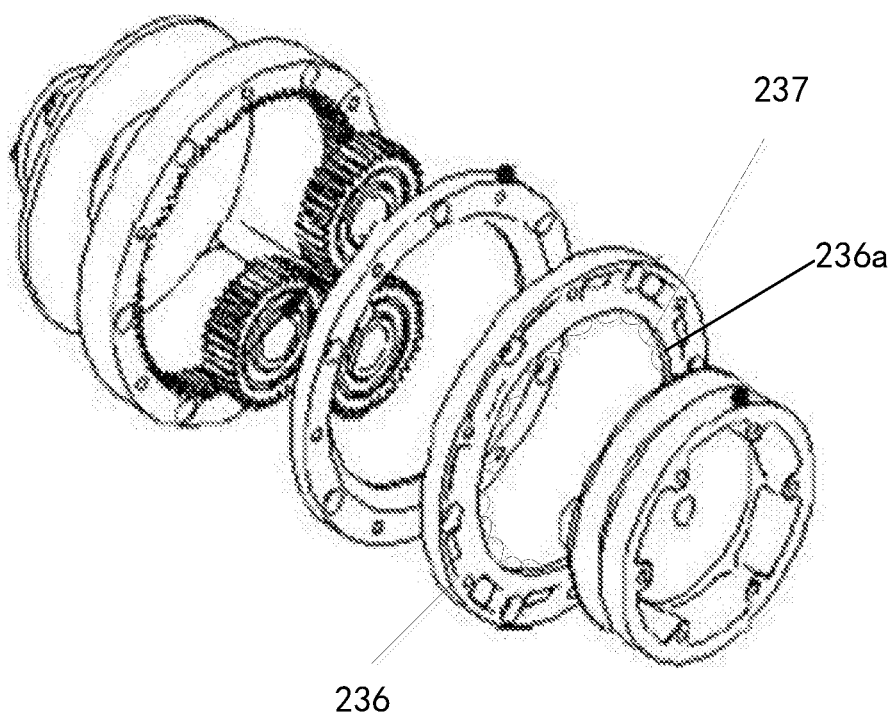
FIG. 10 is another schematic diagram of the planetary reducer according to an actuator embodiment of the present disclosure.

Further, for position restriction of the primary output rotary disc 234 and for prevention of bending of the primary output rotary disc 234 towards the first hollow annular member 235 and the second hollow annular member 236, as illustrated in FIG. 10, the reducer 23 may further include a plurality of first balls 237, a first annular groove 236a is defined on an inner wall of the second hollow annular member 236, and a second annular groove 234a is defined on an outer wall of the primary output rotary disc 234. The first annular groove 236a and the second annular groove 234a cooperate with each other to form a first annular passage. The first balls 237 are received in the first annular passage and is rotatable relative in the first annular passage. The first balls 237 are directly disposed between the second hollow annular member 236 and the primary output rotary disc 234, such that the second hollow annular member 236 restricts the position of the primary output rotary disc 234, with no need to add a bearing on the reducer 23. In this way, the position of the primary output rotary disc 234 is restricted only by improving the original structure of the reducer 23 and adding the first balls 237. This greatly reduces the axial length of the reducer 23 and is favorable to flat design of the reducer 23. Optionally, the first balls 237 have a spherical shape to reduce the friction between the primary output rotary disc 234 and the second hollow annular member 236, which facilitates rotation of the primary output rotary disc 234 relative to the second hollow annular member 236.

Figure 11:
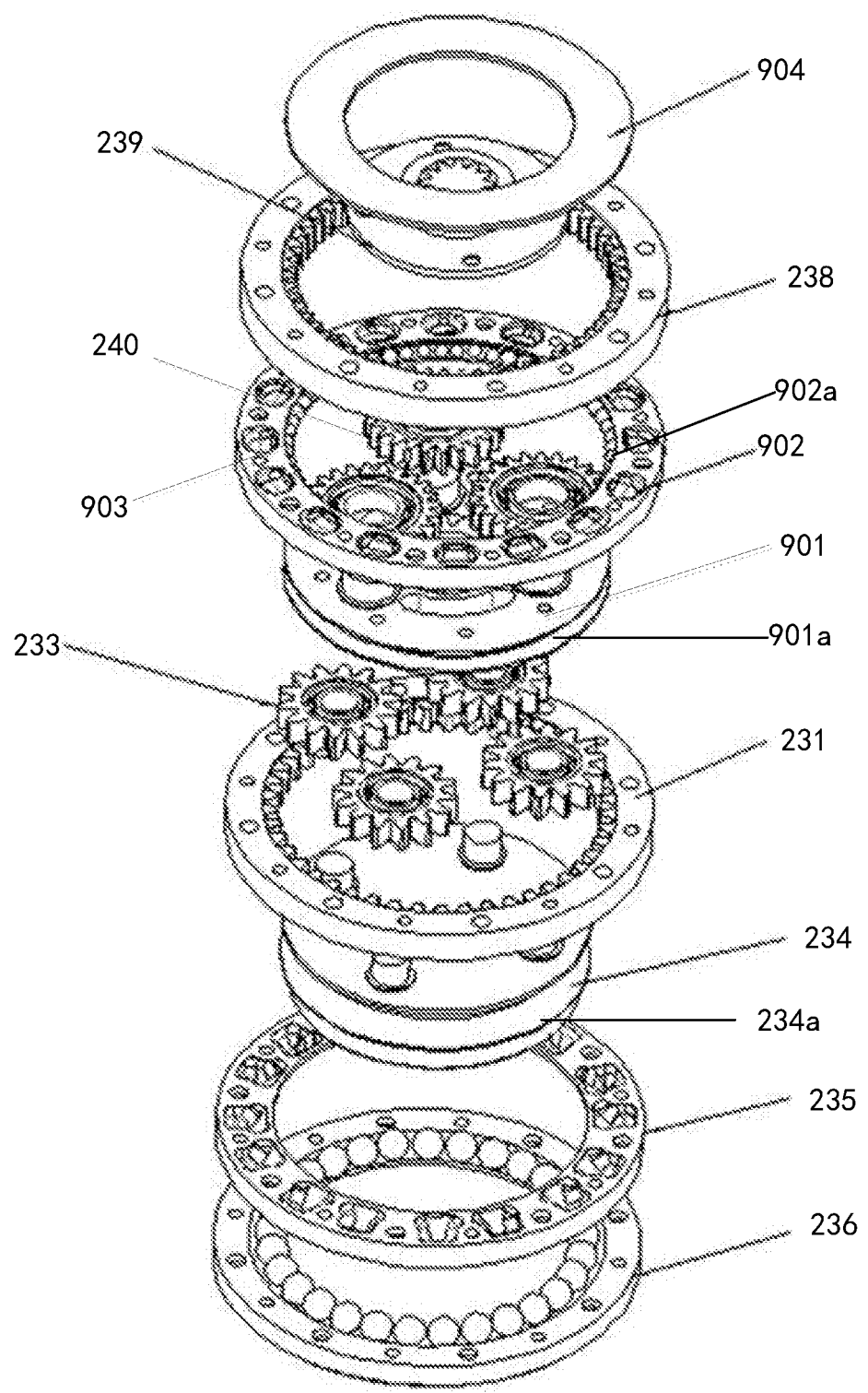
FIG. 11 is an exploded diagram of a bipolar planetary reducer according to an actuator embodiment of the present disclosure.

In some embodiments, the reducer 23 may also be a coaxial double-planet reducer. As illustrated in FIG. 11, in addition to the primary planetary structure described above, the reducer 23 may further include a secondary planetary structure. Specifically, the secondary planetary structure further includes a secondary inner ring gear 238, a secondary sun gear 239, a secondary planetary gear 240 and a second output rotary disc 901. The primary drive shaft of the primary sun gear 232 is disposed on one surface of the second output rotary disc 901, the second planetary gear 240 is disposed on the other surface of the secondary output rotary disc 901 and is rotatable relative to the secondary output rotary disc 901, the secondary sun gear 239 and the secondary planetary gear 240 are disposed in the secondary inner ring gear 240, the secondary planetary gear 240 is in mesh with the secondary sun gear 239 and the secondary inner ring gear 238 respectively, and a secondary drive shaft is extended on the secondary sun gear 239, wherein the secondary drive shaft is connected to the transmission mechanism 26. The motor rotor 211 drives the secondary drive shaft to rotate, the secondary sun gear 239 drives the secondary planetary gear 240 to rotate, between the secondary sun gear 239 and the secondary inner ring gear 238. The secondary planetary gear 240 rotates around the secondary sun gear 239 the secondary planetary gear 240 drives the secondary output rotary disc 901 to rotate, the secondary output rotary disc 901 drives the primary drive shaft to rotate, the primary drive shaft drives the primary sun gear 232 to rotate, the primary sun gear 232 drives the primary planetary gear 233 to rotate, between the primary sun gear 232 and the primary inner ring gear 231, around the primary sun gear, and the primary planetary gear 233 drives the primary output rotary disc 234 to rotate. Optionally, three secondary planetary gears 240 may be provided, and the three secondary planetary gears 240 are evenly spaced apart and are respectively in mesh with the secondary sun gear 239 and the secondary inner ring gear 238. Nevertheless, in other embodiments, the number of secondary planetary gears 240 may be defined as, for example, four, five, six or the like.

It should be noted that in a coaxial double-planet reducer, the primary drive shaft of the primary sun gear 232 is not directly connected to the motor rotor 211, but is indirectly connected to the transmission mechanism 26 via the secondary sun gear 239, the secondary planetary gear 240 and the secondary output rotary disc 901.

Further, the reducer 23 may further include a third hollow annular member 902. The third hollow annular member 902 is disposed on the secondary inner ring gear 238, and is disposed between the secondary inner ring gear 238 and the primary inner ring gear 231. The third hollow annular member 902 surrounds the secondary output rotary disc 901. The third hollow annular member 902 is configured to protect the secondary output rotary disc 901, improve beauty of the reducer 23, and prevent recesses in the middle of the reducer 23.

For position restriction to the secondary output rotary disc 901, the reducer 23 may further include a plurality of second balls 903, a third annular groove (not illustrated in the drawings) is defined on an inner wall of the third hollow annular member 902, and a fourth annular groove (not illustrated in the drawings) is defined on an outer wall of the secondary output rotary disc 901. The third annular groove and the fourth annular groove cooperate with each other to form a second annular passage. The second balls 903 are received in the second annular passage and is rotatable in the second annular groove 234a. The position of the secondary output rotary disc 901 is restricted by improving the original structure of the reducer 23, with no need to add a bearing on the reducer 23. This greatly reduces the axial length of the reducer 23 and is favorable to flat design of the reducer 23. Optionally, the second balls 903 have a spherical shape, the second annular passage has a rhombic cross section, and the second balls 903 are in contact with four points on an inner surface of the second annular passage; and the first annular passage also has a rhombic cross section, the first balls 237 also have a spherical shape, and the first ball 237s are also in contact with four points on an inner surface of the first annular passage.

Further, the reducer 23 further includes a grease isolation spacer 904. The grease isolation spacer 904 is disposed in a circumferential clearance defined between the secondary sun gear 239 and the secondary inner ring gear 238, and the grease spacer 43 is configured to prevent grease from entering the interior of the reducer 23.

Figure 12:
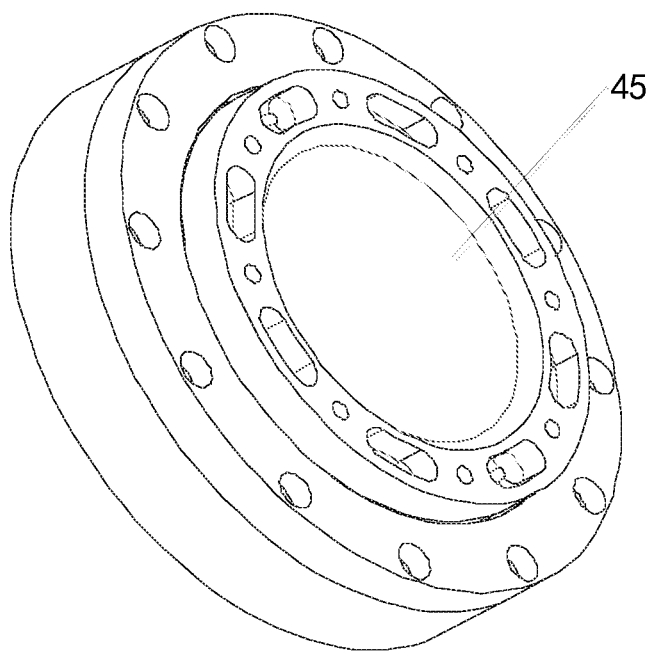
FIG. 12 is a three-dimensional diagram of a spur-gear reducer according to an actuator embodiment of the present disclosure.
Figure 13:
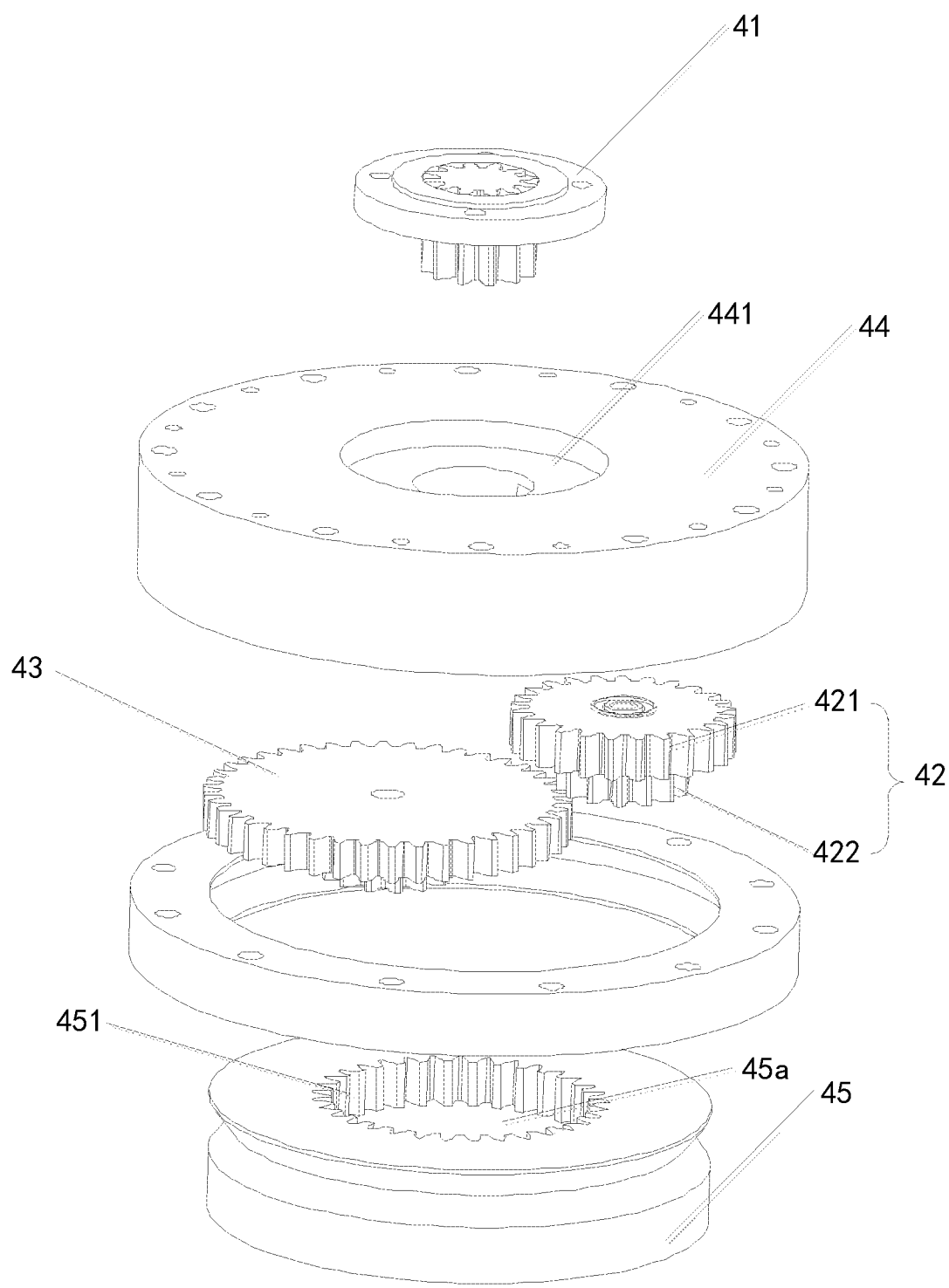
FIG. 13 is an exploded diagram of one vision of the spur-gear reducer according to an actuator embodiment of the present disclosure.
Figure 14:
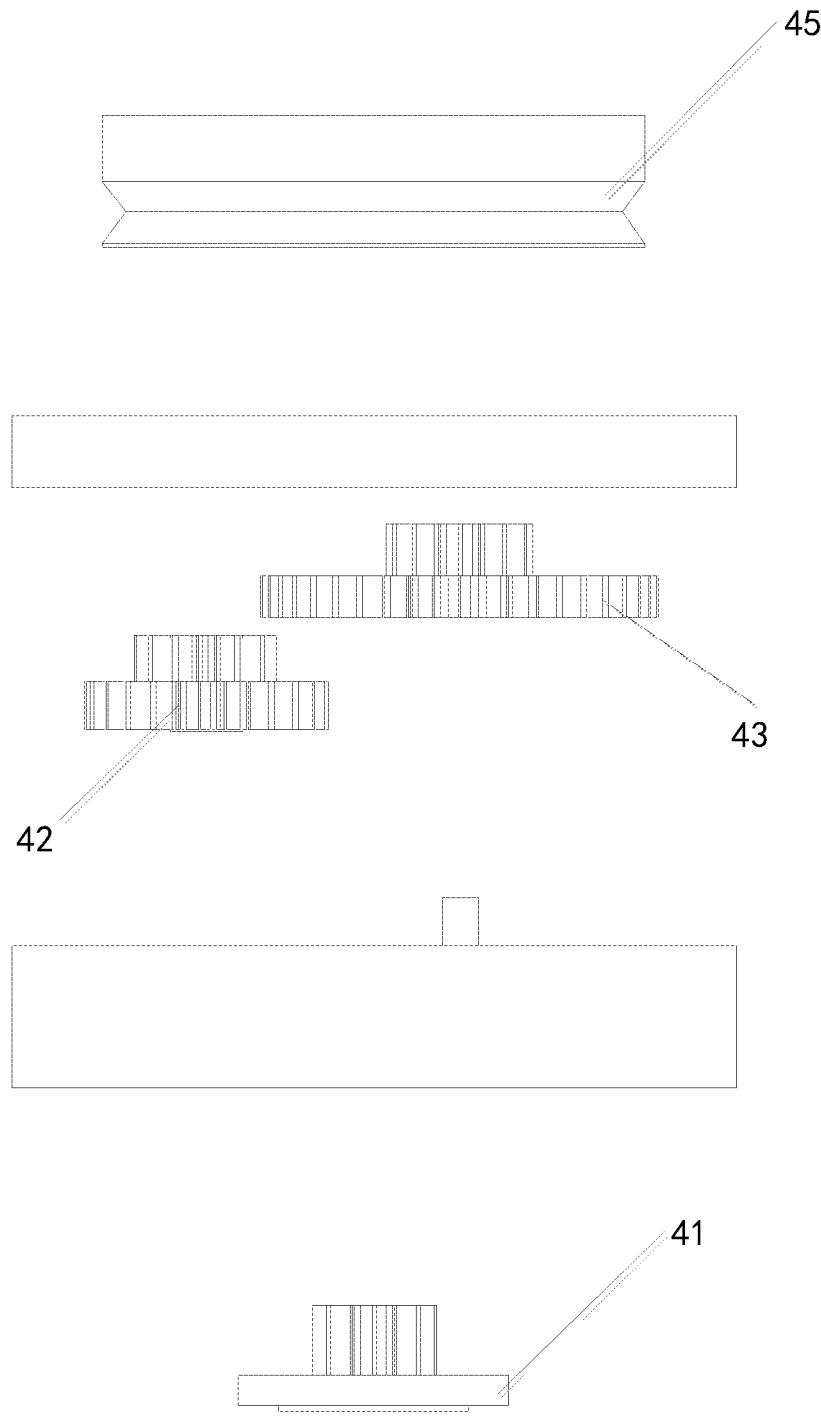
FIG. 14 is an exploded diagram of another vision of the spur-gear reducer according to an actuator embodiment of the present disclosure.

In some embodiments, the reducer 23 may be a spur-gear reducer. As illustrated in FIG. 12 to FIG. 14, the reducer 23 includes a drive gear 41, a duplex transmission gear 42, a driven gear 43, a base 44 and a tertiary output rotary disc 45. A first receiving hole 441 is defined on one surface of the base 44. The drive gear 41 is received in the first receiving hole 441 and is rotatable relative to the first receiving hole 441. The duplex transmission gear 42 and the driven gear 43 are both disposed on the other surface of the base 44, and are both rotatable relative to the base 44. The duplex transmission gear 42 includes a first transmission gear 421 and a second transmission gear 422 that are coaxially fixed. The first transmission gear 421 is in mesh with the drive gear 41, and the second transmission gear 422 is in mesh with the driven gear 43. The driven gear 43 is connected to the tertiary output rotary disc 45, and is configured to drive the tertiary output rotary disc 45 to rotate. One end of the drive gear 41 distal from the first transmission gear 421 is connected to the transmission mechanism 26. The transmission mechanism 26 drives the drive gear 41 to rotate. The drive gear 41 drives the first transmission gear 42l to rotate. The first transmission gear 421 drives the second transmission gear 422 to rotate. The second transmission gear 422 drives the driven gear 43 to rotate. The driven gear 43 drives the tertiary output rotary disc 45 to rotate.

The driven gear 43 may be connected to the tertiary output rotary disc 45 via meshing connection. For example, a plurality of slots 451 is defined on one surface of the tertiary output rotary disc 45. In some embodiments, a second receiving hole 45a is defined on one surface of the tertiary output rotary disc 45; the plurality of slots 451 is defined on an inner wall of the second receiving hole 45a. The driven gear 43 is a duplex gear, wherein one gear of the duplex gear is in mesh with the secondary transmission gear 422, and the other gear of the duplex gear is received in the slots 451 and is in mesh with the slots 451 defined on the inner wall of the second receiving hole 45a, as such, the other gear of the duplex gear is received in the second receiving hole 45a. Such that the tertiary output rotary disc 45 is connected to the driven gear 43. Nevertheless, in addition to the above connection fashions, the driven gear 43 and the tertiary output rotary disc 45 may also be connected in other fashions. For example, the driven gear 43 and the tertiary output rotary disc 45 are disposed on each other via welding, snap-fitting, screwing or the like.

In some embodiments, the reducer 23 is a harmonic reducer.

It should be noted that the reducer 23 is not limited to the above described reducers, and may also be reducers of other types, which are not exhaustively described hereinafter.

Figure 15:
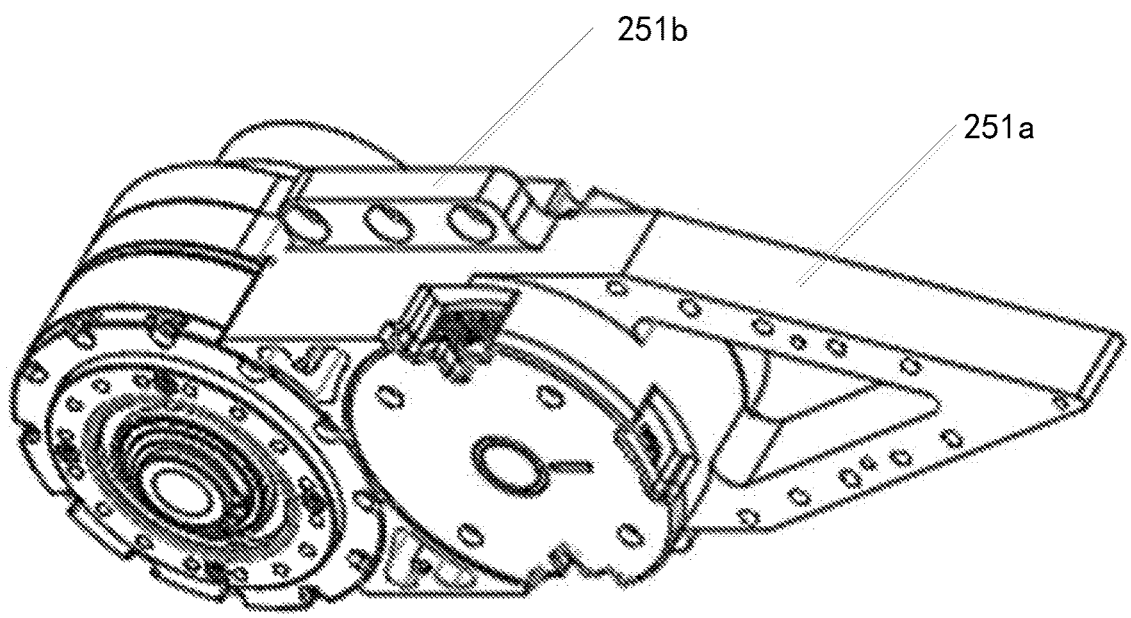
FIG. 15 is a schematic diagram of an actuator acting as a waist turning actuator according to an actuator embodiment of the present disclosure.

It should be noted that the specific appearance and structure of the actuator 20 may be adaptively adjusted based on the specific application environment of the actuator 20. For example:

As illustrated in FIG. 15, the actuator 20 is a waist swinging actuator, and is applied to a waist joint of a robot to perform a waist swinging action. The reducer 23 of the actuator 20 may employ a harmonic reducer. A conic portion 251a and a first fixing portion 251b may be extended on the shell 251 of the actuator 20; wherein the first fixing portion 251b defines a plurality of fixing holes (not illustrated in the drawings), and the conic portion 251a and the first fixing portion 251b are both disposed on other parts of the robot.

Figure 16:
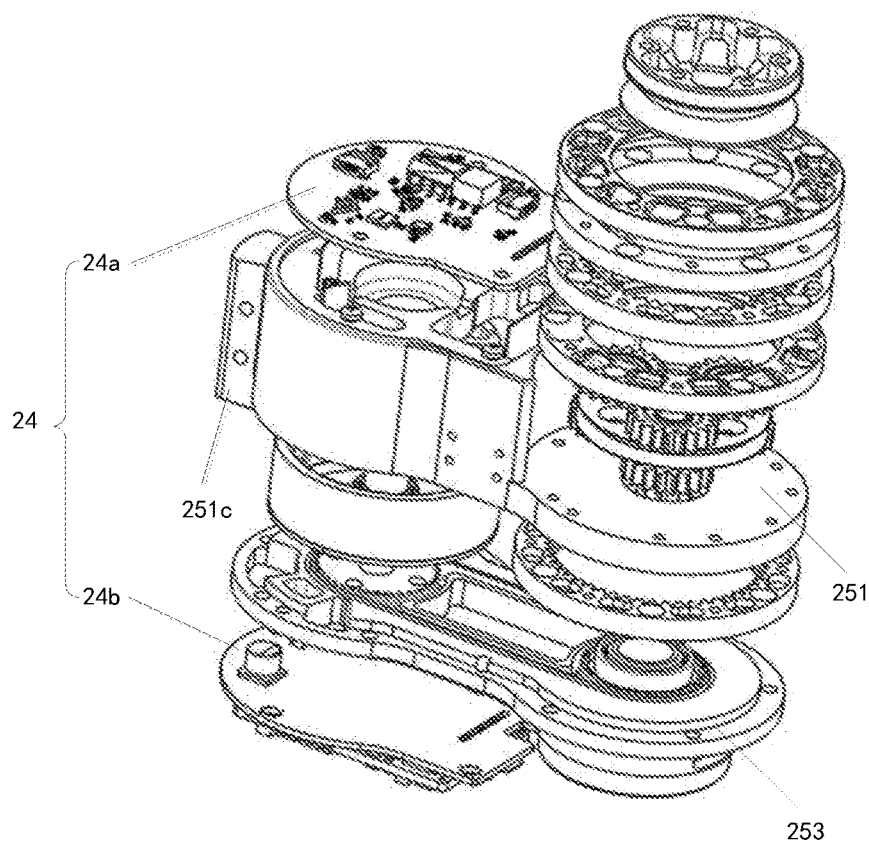
FIG. 16 is a schematic diagram of an actuator acting as a head lifting actuator according to an actuator embodiment of the present disclosure.

As illustrated in FIG. 16, the actuator 20 is a head lifting actuator, and is applied to a head joint of a robot to perform a head lifting action. The reducer 23 of the actuator 20 may employ a planetary reducer. The outer profile of the actuator 20 is large at two ends but small in the middle. The motor driver 24 may be formed by two circuit boards, a first circuit board 24a and a second circuit board 24b; wherein the first circuit board is disposed on the shell 251, and the second circuit board is disposed on a surface of the top cover 253 distal from the shell 251. A second fixing portion 251c is further disposed on an outer side wall of the shell 251, wherein the second fixing portion 251c is configured to be disposed on the other part of the robot.

Figure 17:
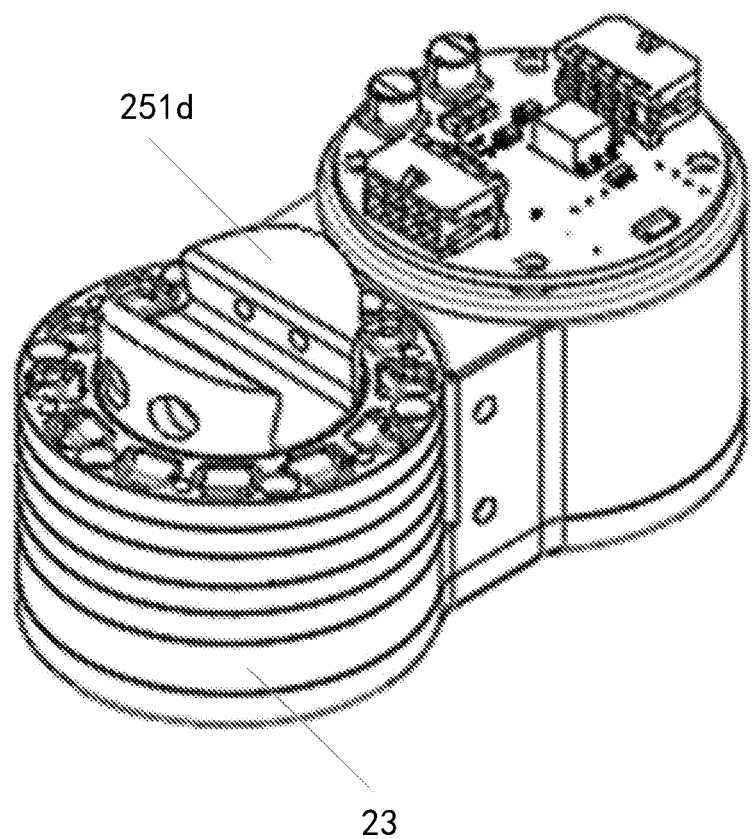
FIG. 17 is one schematic diagram of an actuator acting as a head turning actuator according to an actuator embodiment of the present disclosure.
Figure 18:
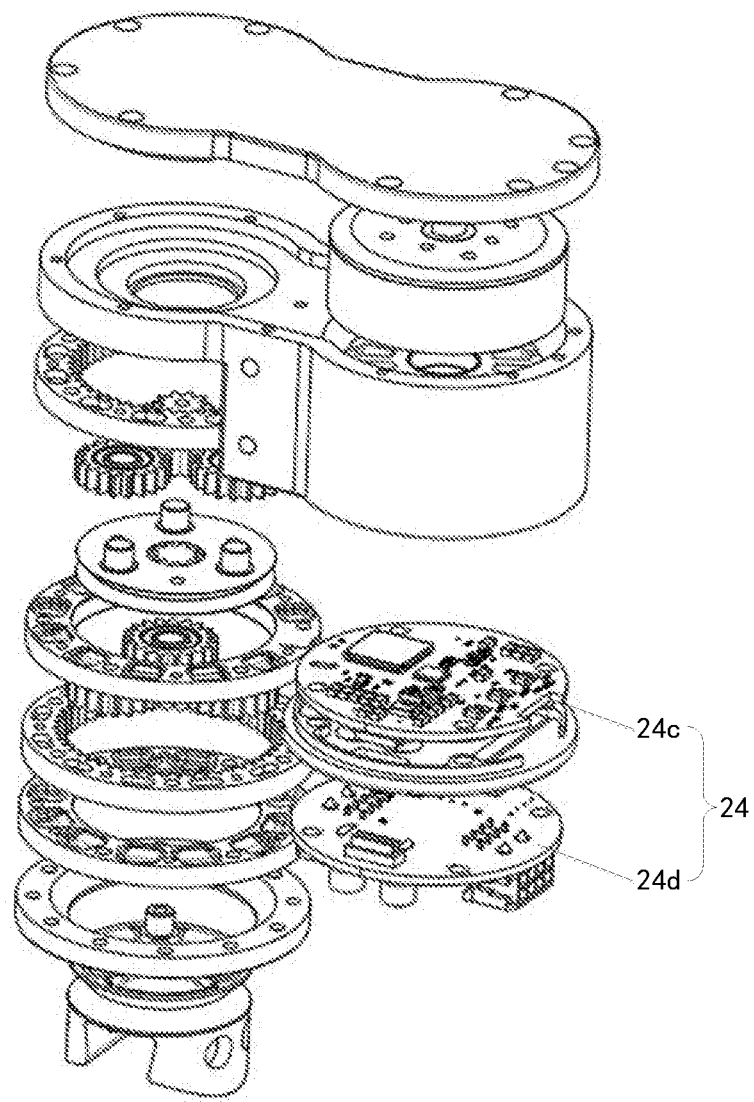
FIG. 18 is another schematic diagram of the actuator acting as the head turning actuator according to an actuator embodiment of the present disclosure.

As illustrated in FIG. 17 and FIG. 18, the actuator 20 is a head turning actuator, and is applied to a head joint of a robot to perform a head turning action. The reducer 23 of the actuator 20 may employ a planetary reducer. The outer profile of the actuator 20 is large at two ends but small in the middle. The motor driver 24 may be formed by two circuit boards, a third circuit board 24c and a fourth circuit board 24d; wherein the third circuit board 24c is disposed between the shell 251 and the rear cover 252, and the fourth circuit board 24d is disposed on a surface of the rear cover 252 distal from the shell 251. The reducer 23 of the actuator 20 may be further provided with a third fixing portion 251d; wherein the third fixing portion 251d defines a fixing groove (not illustrated in the drawings). A fixing through hole (not illustrated in the drawings) is defined on a side wall of the fixing groove.

Figure 19:
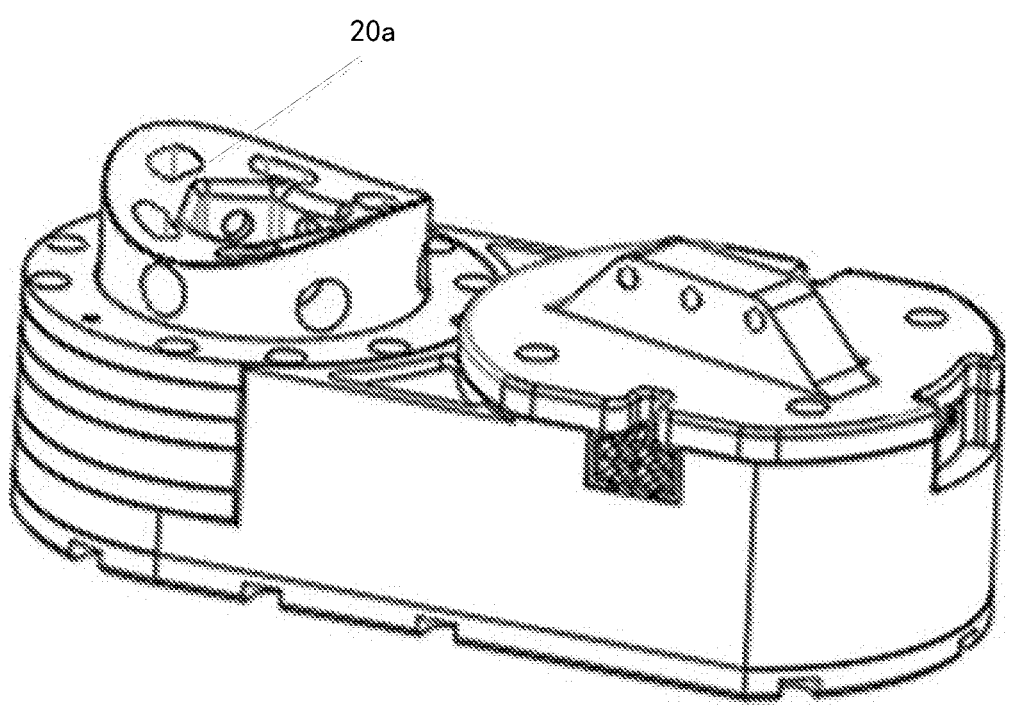
FIG. 19 is one schematic diagram of an actuator acting as an arm actuator according to an actuator embodiment of the present disclosure.
Figure 20:
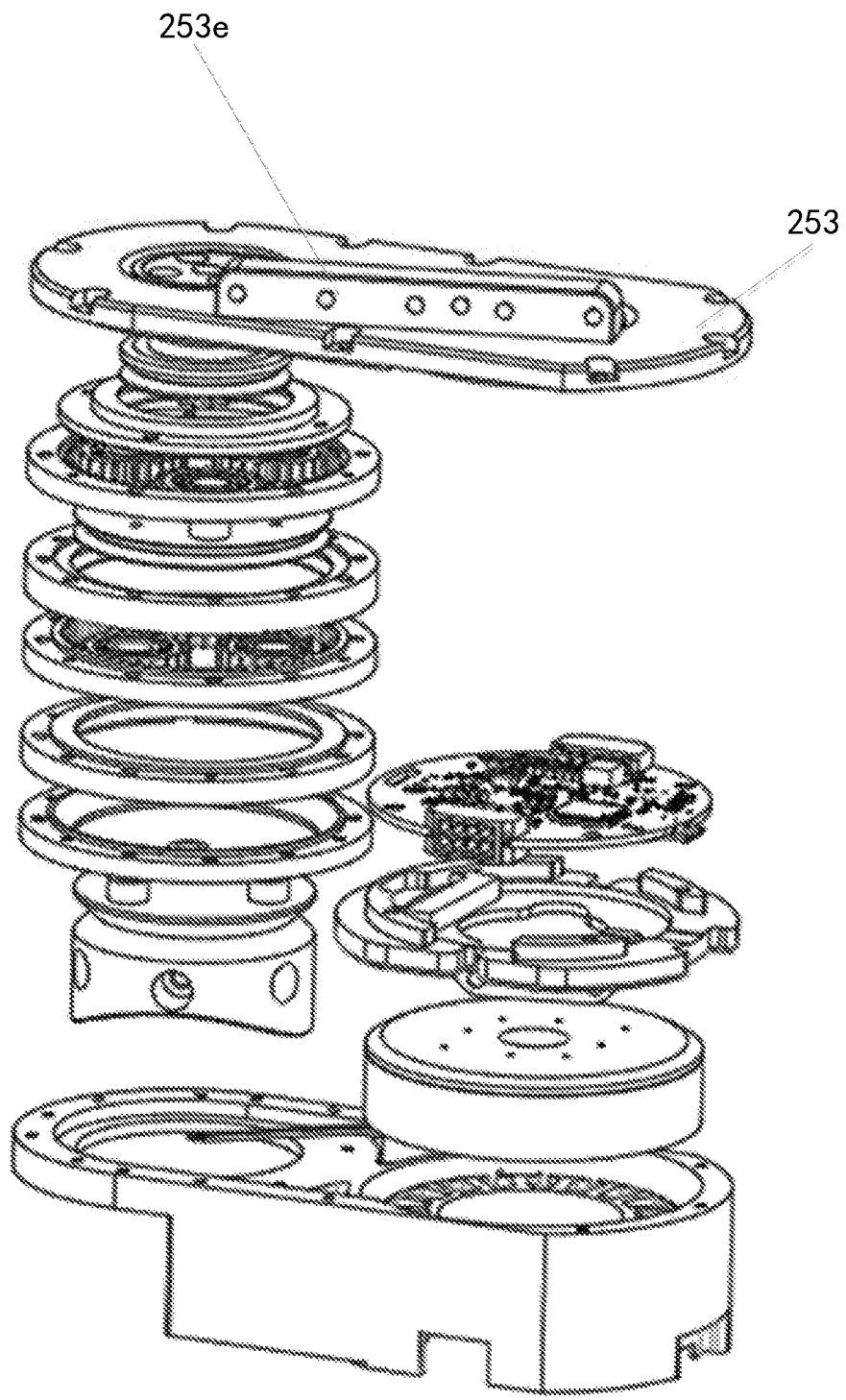
FIG. 20 is another schematic diagram of the actuator acting as the arm actuator according to an actuator embodiment of the present disclosure.

As illustrated in FIG. 19 and FIG. 20, the actuator 20 is an arm actuator, and is applied to an arm joint of a robot to perform an arm lifting and lowering action. The reducer 23 of the actuator 20 may be a planetary reducer. The actuator 20 further includes an output portion 20a; wherein the output portion 20a is connected to the reducer 23. An arc groove (not illustrated in the drawings) is defined on a surface of the output portion 20a distal from the reducer 23. A fourth fixing portion 253e is disposed on a surface of the rear cover 253 distal from the shell 251.

Figure 21:
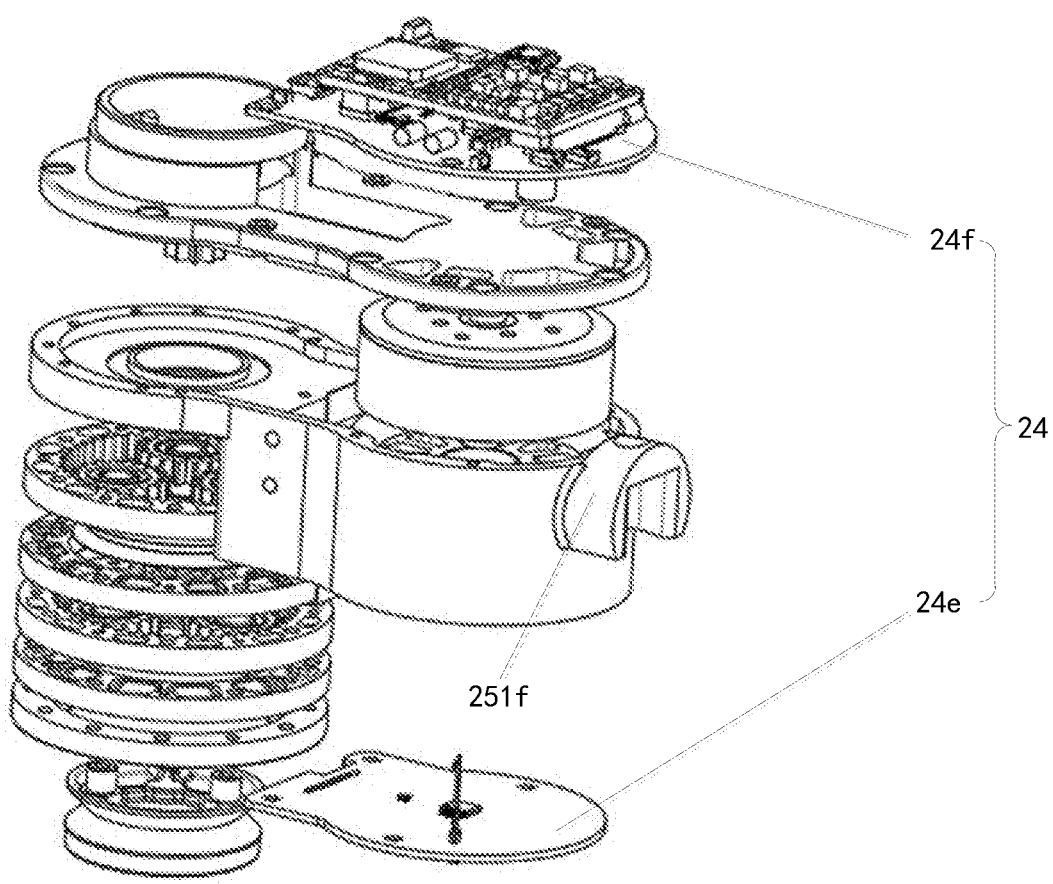
FIG. 21 is a schematic diagram of an actuator acting as an elbow actuator according to an actuator embodiment of the present disclosure.

As illustrated in FIG. 21, the actuator 20 is an elbow actuator, and is applied to an elbow joint of a robot to perform an elbow turning action. The reducer 23 of the actuator 20 may be a planetary reducer. A fifth fixing portion 251f is disposed on an outer wall of the shell 251 of the actuator 20; wherein the fifth fixing portion 251f defines a fixing gap (not illustrated in the drawings). The motor driver 24 may be formed by two circuit boards, a fifth circuit board 24e and a sixth circuit board 24f; wherein the fifth circuit board 24e is disposed on the shell 251, and the sixth circuit board 24f is disposed on a surface of the top cover 253 distal from the shell 251.

In the embodiments of the present disclosure, the actuator 20 includes a motor 21, a position encoder 22, a reducer 23, a motor driver 24, a housing 25 and a transmission mechanism 26. The motor 21 includes a motor stator 212 and a motor rotor 213, wherein the motor stator 211 is disposed on the housing 25, and the motor rotor 211 is rotatably connected to the housing 25 and covers the motor stator 212. In this way, the motor rotor 213 is disposed outside, which is favorable to reduction of the length of the motor 21 in an axial direction and practice of a flat design of the motor 21. The motor driver 24 is disposed on the housing 25, and is electrically connected to the motor 21. The position encoder 22 is disposed on the motor rotor 211. The reducer 23 and the motor 21 are parallelly disposed, and transmission therebetween is practiced via the transmission mechanism 26. In this way, the height of the actuator 20 is further reduced, such that the actuator 20 is flatter. Therefore, integral design of the actuator 20 is practiced, and the actuator 20 has a compact structure, a small volume, a great torque density, a great output torque, and a moderate speed. In addition, the actuator 20 is simply installed and easily controlled, has a high control precision, and may intelligently sense a load under cooperation of the encoder and force sensing and relieve collisions.

The beneficial effects of the present disclosure are described hereinafter again for better understanding of the present disclosure by readers.

(1) Flexible control is practiced by a collimated drive flexible rotary actuator 20 plus a low reduction ratio coaxial reducer, and therefore the cost is low.

(2) The motor driver 24, the position encoder 22, the motor 21 and the reducer 23 are integrated. Therefore, the entire volume is small, the installation and use are convenient. The actuator 20 is applicable to scenarios where higher and stricter requirements are imposed on space.

(3) The flexible mechanism may improve adaptability of the robot to the environment and broaden the application fields of the robot. By measuring a deformation amount of the flexible mechanism, a real-time torque may be obtained, such that advanced control algorithms such as flexible control and the like may be practiced, and the conventional robot joints, the rotary stations, rotary cylinder, step motor, servo motor and direct drive motor and the like rotation actuator mechanisms of the automated equipment may be better replaced.

(4) The motor rotor 211 is disposed outside, and thus has a great magnetic torque radius. Therefore, a high torque density is achieved. The flat design is suitable for a hollow shaft, and for a greater outer diameter, a larger codewheel. In this way, the position encoder 22 has a higher resolution, and the motor 21 has a stronger overload capability.

(5) The actuator 20 according to the present disclosure may share a bus bar with other actuators 20, such that energy generated by one actuator 20 may be recycled to the other actuators 20 for utilization.

(6) According to the present disclosure, the motor 21, the motor driver 24 and the position encoder 22 are all integrated inside the housing 25. The housing 25 is a metal housing. The metal housing may form an electromagnetic shielding layer, such that external electromagnetic interference is not introduced and internal electromagnetic interference is not discharged. Therefore, the actuator 20 has a strong anti-interference capability, and causes no interference to external electronic devices.

(7) The actuator 20 according to the present disclosure has a strong impact resistance. Therefore, the life time of the fragile transmission part is prolonged, the heavy designs thereof are reduced, complexity of the dynamic calculation is lowered, physical torsion spring, rigid regulation mechanism and power/torque sensor are not desired, and high bandwidth force control in case of no contact force feedback.

(8) The motor according to the present disclosure employs a flat design, and thus has a strong anti-axial and radial torsion.

(9) The actuator 20 according to the present disclosure has a high precision and speed.

An embodiment of the present disclosure further provides a robot arm. The robot arm includes the above described actuator 20. With respect to the specific structure and functions of the actuator 20, reference may be made to the above embodiments, which are thus not exhaustively described herein any further.

An embodiment of the present disclosure further provides a robot. The robot includes the above described robot arm.

With respect to the specific structure and functions of the robot arm, reference may be made to the above embodiments, which are thus not exhaustively described herein any further.

It should be finally noted that the above-described embodiments are merely for illustration of the present disclosure, but are not intended to limit the present disclosure. Although the present disclosure is described in detail with reference to these embodiments, a person skilled in the art may also make various modifications to the technical solutions disclosed in the embodiments, or make equivalent replacements to a part of or all technical features contained therein. Such modifications or replacement, made without departing from the principles of the present disclosure, shall fall within the scope defined by the claims and the specification of the present disclosure. Especially, various technical features mentioned in various embodiments may be combined in any fashion as long as there is no structural conflict. The present disclosure is not limited to the specific embodiments described herein in this specification, but also includes all the technical solutions falling within the scope subjected to the appended claims.

What is claimed is:

1. An actuator, comprising:
   a housing;
   a motor, comprising a motor stator and a motor rotor, wherein the motor stator is disposed on the housing, the motor rotor is rotatably connected to the housing, and the motor rotor covers the motor stator;
   a position encoder, disposed on the motor rotor;
   a motor driver, disposed on the housing, and electrically connected to the motor;
   a reducer, disposed on the housing, and disposed parallel with the motor; and
   a transmission mechanism, connected to the motor rotor and the reducer respectively;
   wherein the reducer is configured to adjust a rotation speed output from the motor rotor;
   wherein the reducer comprises a primary inner ring gear, a primary sun gear, a primary planetary gear and a primary output rotary disc; wherein the primary planetary gear is disposed on a surface of the primary output rotary disc and is rotatable relative to the primary output rotary disc, wherein the primary inner ring gear is disposed to surround the primary sun gear and the primary planetary gear, the primary planetary gear is in mesh with the primary sun gear and the primary inner ring gear respectively, and a primary drive shaft is extended on the primary sun gear, wherein the primary drive shaft is connected to the transmission mechanism;
   wherein the reducer further comprises a first hollow annular member and a second hollow annular member;
   wherein the first hollow annular member is disposed on the primary inner ring gear, the second hollow annular member is disposed on the first hollow annular member, and the first hollow annular member and the second hollow annular member both surround the primary output rotary disc;
   wherein the reducer further comprises a plurality of first balls; wherein
   a first annular groove is defined on an inner wall of the second hollow annular member, a second annular groove is defined on an outer wall of the primary output rotary disc; wherein the first annular groove and the second annular groove cooperate with each other to form a first annular passage, wherein the first balls are received in the first annular passage and are rotatable in the first annular passage.

2. The actuator according to claim 1, wherein
   the transmission mechanism comprises a first synchronization wheel, a second synchronization wheel and a synchronization belt;
   wherein the first synchronization wheel is connected to the motor rotor, the second synchronization wheel is connected to the reducer, and the synchronization belt is sleeved between the first synchronization wheel and the second synchronization wheel.

3. The actuator according to claim 1, wherein
   the housing comprises a shell, a rear cover and a top cover;
   wherein the shell defines a motor slot and an adjustment groove, the motor slot comprising a rotation groove and a drive groove; wherein the motor stator and the motor rotor are both disposed in the rotation groove, the motor driver is disposed in the drive groove, and the rear cover is disposed at the mouth of the drive groove and configured to close the drive groove; and
   wherein the top cover is disposed to cover the rotation groove and the adjustment groove, and wherein the top cover further defines a transmission groove, the transmission groove being configured to receive the transmission mechanism.

4. The actuator according to claim 3, wherein
   a sleeve portion is extended from the bottom of the rotation groove towards the interior of the rotation groove on the housing, the motor stator is sleeved onto the sleeve portion, and wherein the motor rotor is rotatably connected to the sleeve portion and covers the motor stator.

5. The actuator according to claim 4, wherein
   the motor stator comprises a skeleton and a winding, wherein the skeleton defines a pocket surrounded by a plurality of slots, the winding is wound on the plurality of slots, and the sleeve portion is inserted into the pocket.

6. The actuator according to claim 5, wherein the winding is a high temperature resistant coil made of enameled wire material.

7. The actuator according to claim 1, wherein
   the first annular passage has a rhombic cross section, and the first balls are in contact with four points on an inner surface of the first annular passage.

8. The actuator according to claim 1, wherein
   the reducer comprises a secondary inner ring gear, a secondary sun gear, a secondary planetary gear and a secondary output rotary disc;
   wherein the primary drive shaft of the primary sun gear is disposed on one surface of the second output rotary disc, the second planetary gear is disposed on the other surface of the secondary output rotary disc and is rotatable relative to the secondary output rotary disc, wherein the secondary sun gear and the secondary planetary gear are disposed in the secondary inner ring gear, the secondary planetary gear is in mesh with the secondary sun gear and the secondary inner ring gear respectively, and a secondary drive shaft is extended on the secondary sun gear, wherein the secondary drive shaft is connected to the transmission mechanism.

9. The actuator according to claim 8, wherein
   the reducer further comprises a third hollow annular member;

wherein the third hollow annular member is disposed on the secondary inner ring gear and is disposed between the secondary inner ring gear and the primary inner ring gear, and the third hollow annular member surrounds the secondary output rotary disc.

10. The actuator according to claim 9, wherein
the reducer further comprises a plurality of second balls; wherein
a third annular groove is defined on an inner wall of the third hollow annular member, a fourth annular groove is defined on an outer wall of the secondary output rotary disc; wherein the third annular groove and the fourth annular groove cooperate with each other to form a second annular passage, wherein the second balls are received in the second annular passage and rotatable in the second annular passage.

11. The actuator according to claim 10, wherein
the second annular passage has a rhombic cross section, and the second balls are in contact with four points on an inner surface of the second annular passage.

12. The actuator according to claim 1, wherein
the reducer comprises a drive gear, a duplex transmission gear, a driven gear, a base and a tertiary output rotary disc;
wherein a first receiving hole is defined on one surface of the base, the drive gear is received in the first receiving hole and is rotatable relative to the first receiving hole, the duplex transmission gear and the driven gear are both disposed on the other surface of the base and are rotatable relative to the base, the duplex transmission gear comprises a first transmission gear and a second transmission gear that are coaxially fixed, wherein the first transmission gear is in mesh with the drive gear, the second transmission gear is in mesh with the driven gear, the driven gear is connected to the tertiary output rotary disc and is configured to drive the tertiary output rotary disc to rotate, and the drive gear is connected to the transmission mechanism.

13. The actuator according to claim 12, wherein
a second receiving hole is defined on one surface of the tertiary output rotary disc, a plurality of slots is defined on an inner wall of the second receiving hole, and the driven gear is a duplex gear; wherein one gear of the duplex gear is in mesh with the second transmission gear, and the other gear of the duplex gear is received in the second receiving hole and is in mesh with the slots defined on the inner wall of the second receiving hole.

14. A robot arm, comprising an actuator, wherein the actuator comprises:
a housing;
a motor, comprising a motor stator and a motor rotor, wherein the motor stator is disposed on the housing, the motor rotor is rotatably connected to the housing, and the motor rotor covers the motor stator;
a position encoder, disposed on the motor rotor;
a motor driver, disposed on the housing, and electrically connected to the motor;
a reducer, disposed on the housing, and disposed parallel with the motor; and
a transmission mechanism, connected to the motor rotor and the reducer respectively;
wherein the reducer is configured to adjust a rotation speed output from the motor rotor;
wherein the reducer comprises a primary inner ring gear, a primary sun gear, a primary planetary gear and a primary output rotary disc; wherein the primary planetary gear is disposed on a surface of the primary output rotary disc and is rotatable relative to the primary output rotary disc, wherein the primary inner ring gear is disposed to surround the primary sun gear and the primary planetary gear, the primary planetary gear is in mesh with the primary sun gear and the primary inner ring gear respectively, and a primary drive shaft is extended on the primary sun gear, wherein the primary drive shaft is connected to the transmission mechanism;
wherein the reducer further comprises a first hollow annular member and a second hollow annular member;
wherein the first hollow annular member is disposed on the primary inner ring gear, the second hollow annular member is disposed on the first hollow annular member, and the first hollow annular member and the second hollow annular member both surround the primary output rotary disc;
wherein the reducer further comprises a plurality of first balls; wherein
a first annular groove is defined on an inner wall of the second hollow annular member, a second annular groove is defined on an outer wall of the primary output rotary disc; wherein the first annular groove and the second annular groove cooperate with each other to form a first annular passage, wherein the first balls are received in the first annular passage and are rotatable in the first annular passage.

15. The robot arm according to claim 14, wherein
the transmission mechanism comprises a first synchronization wheel, a second synchronization wheel and a synchronization belt;
wherein the first synchronization wheel is connected to the motor rotor, the second synchronization wheel is connected to the reducer, and the synchronization belt is sleeved between the first synchronization wheel and the second synchronization wheel.

16. The robot arm according to claim 14, wherein the housing comprises a shell, a rear cover and a top cover;
wherein the shell defines a motor slot and an adjustment groove, the motor slot comprising a rotation groove and a drive groove; wherein the motor stator and the motor rotor are both disposed in the rotation groove, the motor driver is disposed in the drive groove, and the rear cover is disposed at the mouth of the drive groove and configured to close the drive groove; and
wherein the top cover is disposed to cover the rotation groove and the adjustment groove, and wherein the top cover further defines a transmission groove, the transmission groove being configured to receive the transmission mechanism.

17. The robot arm according to claim 16, wherein
a sleeve portion is extended from the bottom of the rotation groove towards the interior of the rotation groove on the housing, the motor stator is sleeved onto the sleeve portion, and wherein the motor rotor is rotatably connected to the sleeve portion and covers the motor stator.

18. The robot arm according to claim 17, wherein
the motor stator comprises a skeleton and a winding, wherein the skeleton defines a pocket surrounded by a plurality of slots, the winding is wound on the plurality of slots, and the sleeve portion is inserted into the pocket.

19. The robot arm according to claim 14, wherein
the first annular passage has a rhombic cross section, and the first balls are in contact with four points on an inner surface of the first annular passage.

20. A robot, comprising a robot arm, wherein the robot arm comprises an actuator, the actuator comprising:
- a housing;
- a motor, comprising a motor stator and a motor rotor, wherein the motor stator is disposed on the housing, the motor rotor is rotatably connected to the housing, and the motor rotor covers the motor stator;
- a position encoder, disposed on the motor rotor;
- a motor driver, disposed on the housing, and electrically connected to the motor;
- a reducer, disposed on the housing, and disposed parallel with the motor; and
- a transmission mechanism, connected to the motor rotor and the reducer respectively;
- wherein the reducer is configured to adjust a rotation speed output from the motor rotor;
- wherein the reducer comprises a primary inner ring gear, a primary sun gear, a primary planetary gear and a primary output rotary disc; wherein the primary planetary gear is disposed on a surface of the primary output rotary disc and is rotatable relative to the primary output rotary disc, wherein the primary inner ring gear is disposed to surround the primary sun gear and the primary planetary gear, the primary planetary gear is in mesh with the primary sun gear and the primary inner ring gear respectively, and a primary drive shaft is extended on the primary sun gear, wherein the primary drive shaft is connected to the transmission mechanism;
- wherein the reducer further comprises a first hollow annular member and a second hollow annular member;
- wherein the first hollow annular member is disposed on the primary inner ring gear, the second hollow annular member is disposed on the first hollow annular member, and the first hollow annular member and the second hollow annular member both surround the primary output rotary disc;
- wherein the reducer further comprises a plurality of first balls; wherein
- a first annular groove is defined on an inner wall of the second hollow annular member, a second annular groove is defined on an outer wall of the primary output rotary disc; wherein the first annular groove and the second annular groove cooperate with each other to form a first annular passage, wherein the first balls are received in the first annular passage and are rotatable in the first annular passage.

* * * * *